US009649766B2

(12) United States Patent
Stubbs et al.

(10) Patent No.: US 9,649,766 B2
(45) Date of Patent: May 16, 2017

(54) SYSTEMS AND METHODS TO FACILITATE HUMAN/ROBOT INTERACTION

(71) Applicant: Amazon Technologies, Inc., Seattle, WA (US)

(72) Inventors: Andrew Stubbs, Waltham, MA (US); Matthew David Verminski, North Andover, MA (US); Stephen Caldara, Cambridge, MA (US); Robert Michael Shydo, Jr., Pelham, NH (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 14/660,161

(22) Filed: Mar. 17, 2015

(65) Prior Publication Data

US 2016/0271800 A1 Sep. 22, 2016

(51) Int. Cl.
 G05B 19/18 (2006.01)
 B25J 9/16 (2006.01)
 G06K 7/10 (2006.01)
 G05D 1/02 (2006.01)

(52) U.S. Cl.
 CPC .......... *B25J 9/1666* (2013.01); *B25J 9/1676* (2013.01); *G05D 1/0234* (2013.01); *G05D 1/0261* (2013.01); *G06K 7/10366* (2013.01); G05B 2219/40202 (2013.01); G05D 2201/0216 (2013.01); Y10S 901/01 (2013.01)

(58) Field of Classification Search
 CPC ... B25J 9/1666; B25J 9/0003; G06K 7/10366; Y10S 901/01
 See application file for complete search history.

(56) References Cited

U.S. PATENT DOCUMENTS

| 5,198,800 A | 3/1993 | Tozawa et al. |
| 5,570,992 A | 11/1996 | Lemelson |
| 5,939,986 A | 8/1999 | Schiffbauer et al. |

(Continued)

FOREIGN PATENT DOCUMENTS

DE 102013001987 8/2014

OTHER PUBLICATIONS

Vicentini et al ( Wireless Sensor Networks and Safe protocols for user tracking in Human—Robot Cooperative workspaces, 978-1-4799-1/14, 2014 IEEE).*

(Continued)

*Primary Examiner* — Ian Jen
(74) *Attorney, Agent, or Firm* — Lee & Hayes, PLLC

(57) ABSTRACT

Short range transmissions are used to identify potential interactions between warehouse workers and warehouse robots in automated warehouses. The robot can be equipped with one or more short range transmission tags, such as radio frequency identification (RFID) tags, while the warehouse worker can be equipped with a short range transmission reader, such as an RFID reader. The robot can detect a warehouse worker that is within range when the RFID tags on the robot are written to by the RFID reader. The warehouse robots and warehouse workers can also be equipped with one or more cameras to identify fiducials in the automated warehouse and to report their positions. A central control or interaction server can ensure that warehouse robots and warehouse workers are routed appropriately to avoid incidents.

20 Claims, 13 Drawing Sheets

(56) References Cited

U.S. PATENT DOCUMENTS

| | | | |
|---|---|---|---|
| 6,061,617 A | 5/2000 | Berger et al. | |
| 6,687,571 B1 | 2/2004 | Byrne et al. | |
| 6,708,385 B1 | 3/2004 | Lemelson | |
| 6,784,800 B2* | 8/2004 | Orzechowski | B66F 9/0755 340/539.1 |
| 6,845,311 B1 | 1/2005 | Stratton et al. | |
| 6,963,278 B2* | 11/2005 | Frame | B66C 15/045 340/539.22 |
| 7,062,381 B1 | 6/2006 | Rekow et al. | |
| 7,079,931 B2 | 7/2006 | Sahm et al. | |
| 7,310,439 B2 | 12/2007 | Silverstein | |
| 7,353,089 B1 | 4/2008 | McEvoy | |
| 7,400,959 B2 | 7/2008 | Price et al. | |
| 7,683,782 B2 | 3/2010 | Christopher | |
| 7,728,729 B2 | 6/2010 | Christopher | |
| 7,863,848 B2* | 1/2011 | Sjoberg | B25J 13/06 318/563 |
| 7,890,235 B2* | 2/2011 | Self | G01S 3/143 340/539.1 |
| 8,115,650 B2* | 2/2012 | Dasilva | G08B 25/016 340/539.1 |
| 8,174,358 B2 | 5/2012 | Butzine et al. | |
| 8,179,257 B2* | 5/2012 | Allen, Jr. | F16P 3/14 340/5.92 |
| 8,195,344 B2* | 6/2012 | Song | G08C 17/00 701/2 |
| 8,514,081 B2* | 8/2013 | Cristache | G01S 13/876 340/10.1 |
| 8,970,363 B2* | 3/2015 | Kraimer | B60R 21/0132 172/2 |
| 8,972,045 B1 | 3/2015 | Mountz et al. | |
| 9,041,561 B2 | 5/2015 | Wallace et al. | |
| 9,122,276 B2* | 9/2015 | Kraimer | G05D 1/0016 |
| 9,126,334 B2* | 9/2015 | Nakamura | B25J 9/1676 |
| 2004/0221790 A1 | 11/2004 | Sinclair et al. | |
| 2004/0249510 A1 | 12/2004 | Hanson | |
| 2005/0107934 A1* | 5/2005 | Gudat | G01S 5/0072 701/50 |
| 2007/0192910 A1 | 8/2007 | Vu et al. | |
| 2008/0009967 A1 | 1/2008 | Bruemmer | |
| 2009/0033269 A1* | 2/2009 | Griessnig | H04Q 9/00 318/563 |
| 2009/0141938 A1 | 6/2009 | Lim et al. | |
| 2009/0157228 A1 | 6/2009 | Hong et al. | |
| 2010/0076600 A1 | 3/2010 | Cross et al. | |
| 2010/0222925 A1 | 9/2010 | Anezaki | |
| 2011/0010024 A1 | 1/2011 | Salisbury | |
| 2011/0227748 A1 | 9/2011 | Schaible et al. | |
| 2012/0182392 A1 | 7/2012 | Kearns et al. | |
| 2012/0265391 A1 | 10/2012 | Letsky | |
| 2012/0326837 A1* | 12/2012 | Ajay | A61F 9/029 340/5.2 |
| 2013/0108992 A1 | 5/2013 | Buelthoff et al. | |
| 2013/0231779 A1 | 9/2013 | Purkayastha et al. | |
| 2014/0135984 A1* | 5/2014 | Hirata | B25J 19/06 700/255 |
| 2014/0160250 A1 | 6/2014 | Pomerantz et al. | |
| 2014/0277691 A1* | 9/2014 | Jacobus | G06Q 10/087 700/216 |
| 2014/0326580 A1 | 11/2014 | Carpenter et al. | |
| 2015/0088310 A1 | 3/2015 | Pinter et al. | |
| 2015/0158182 A1 | 6/2015 | Farlow et al. | |
| 2015/0332463 A1 | 11/2015 | Galera et al. | |
| 2016/0057925 A1 | 3/2016 | Letsky | |
| 2016/0165795 A1 | 6/2016 | Balutis et al. | |
| 2016/0274586 A1 | 9/2016 | Stubbs et al. | |

OTHER PUBLICATIONS

Ettouhami, et al, "Human-Robot Collision Avoidance with RFID Sensors Using Fuzzy Logic and Extended Kalman Filter", Applied Mathematical Sciences, Jan. 1, 2013, pp. 2555-2567, retrieved from the internet at URL://http://www.m-hikari.com/ams/ams-2013/ams-49-52-2013/ettouhamiAMS49-52-2013.pdf, retrived on Apr. 23, 2016.

PCT Search Report and Written Opinion mailed May 19, 2016 for PCT application No. PCT/US2016/022443, 14 pages.

Shen, et al., "Safe Assembly Motion—A Novel Approach for Applying Human-Robot Co-operation in Hybrid Assembly Systems", 2013 IEEE International Conference on Mechantronics and Automation, IEEE, Aug. 4, 2013, pp. 7-12, retrieved on Oct. 2, 2013.

Vicentini, et al., "Wireless Sensor Networks and Safe Protocols for user tracking in Human-Robot Cooperative workspaces", 2014 IEEE 23rd International Symposium on Industrial Electronics (ISIE), IEEE, Jun. 1, 2014, pp. 1274-1279, retrieved on Jul. 24, 2014.

Office action for U.S. Appl. No. 14/660,259, mailed on Mar. 11, 2016, Stubbs et al., "System and Methods to Facilitate Human/Robot Interaction ", 15 pages.

\* cited by examiner

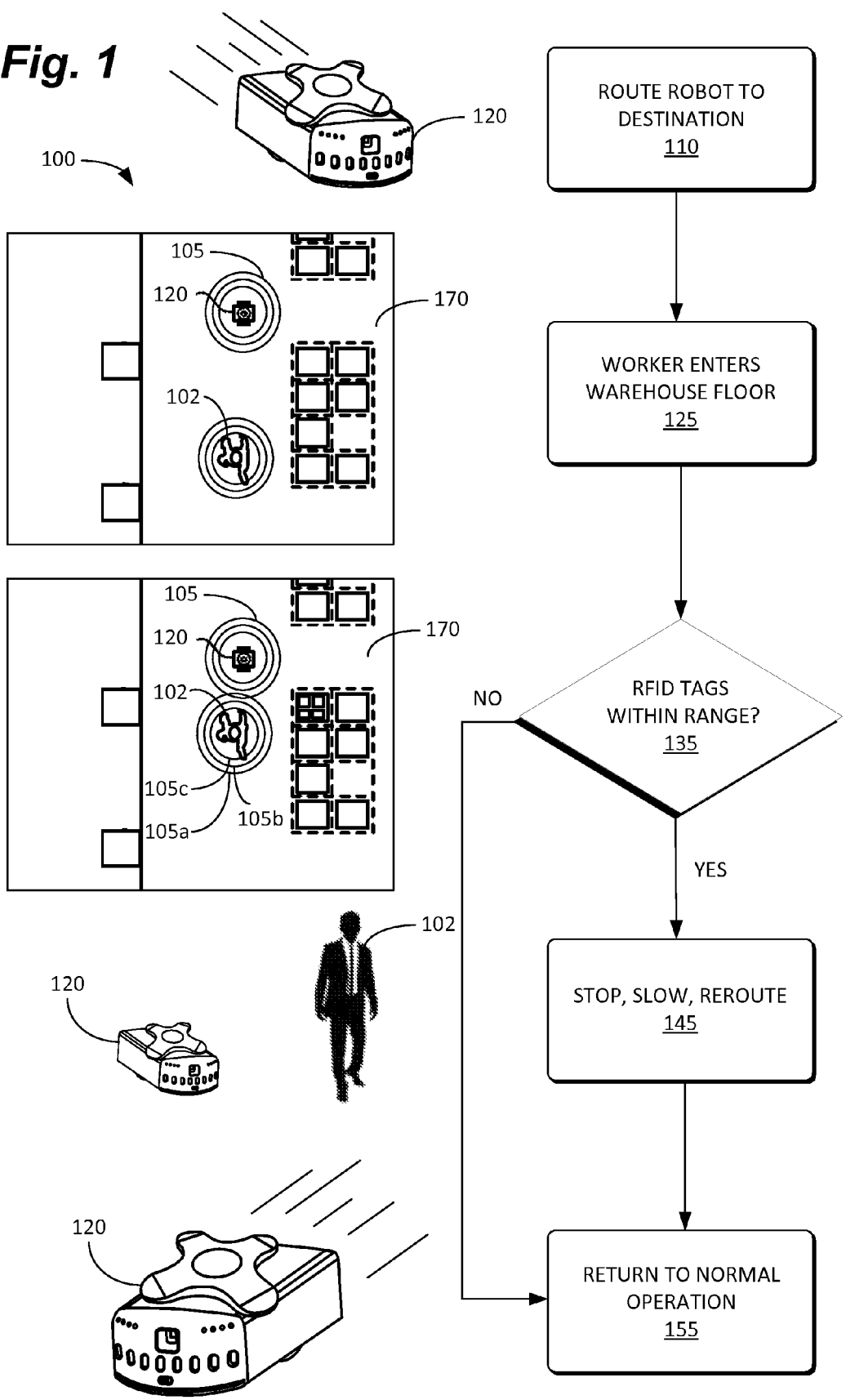

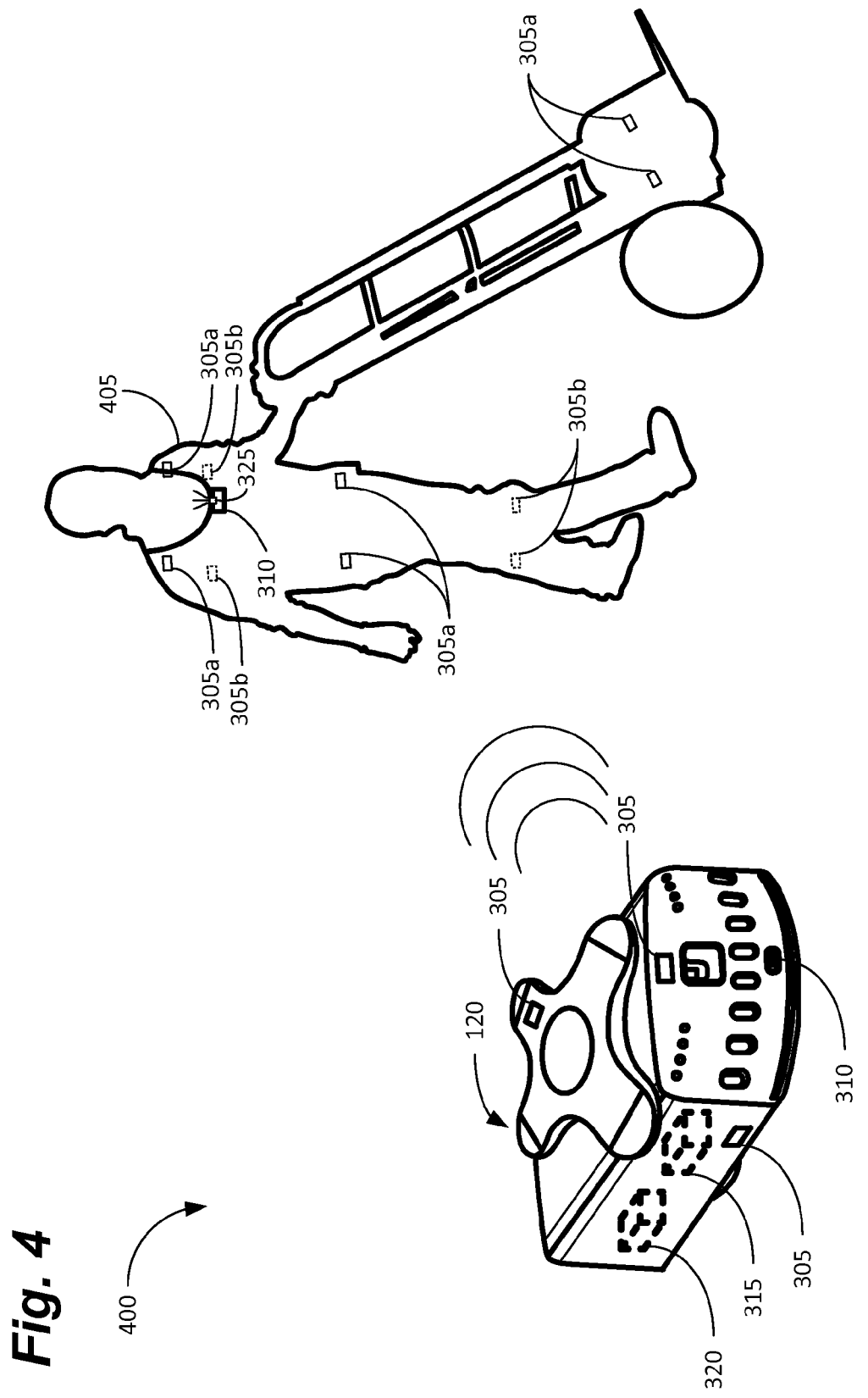

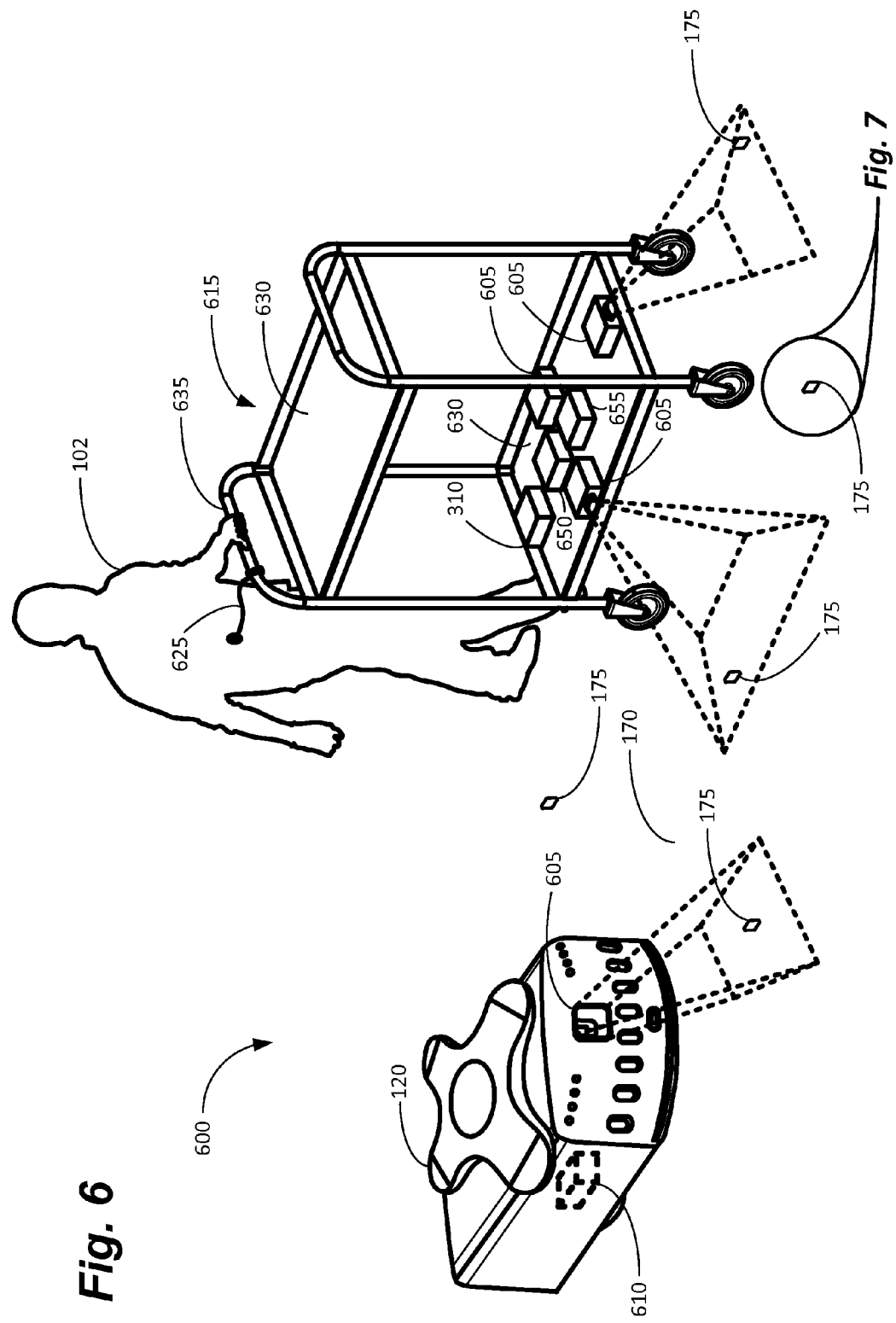

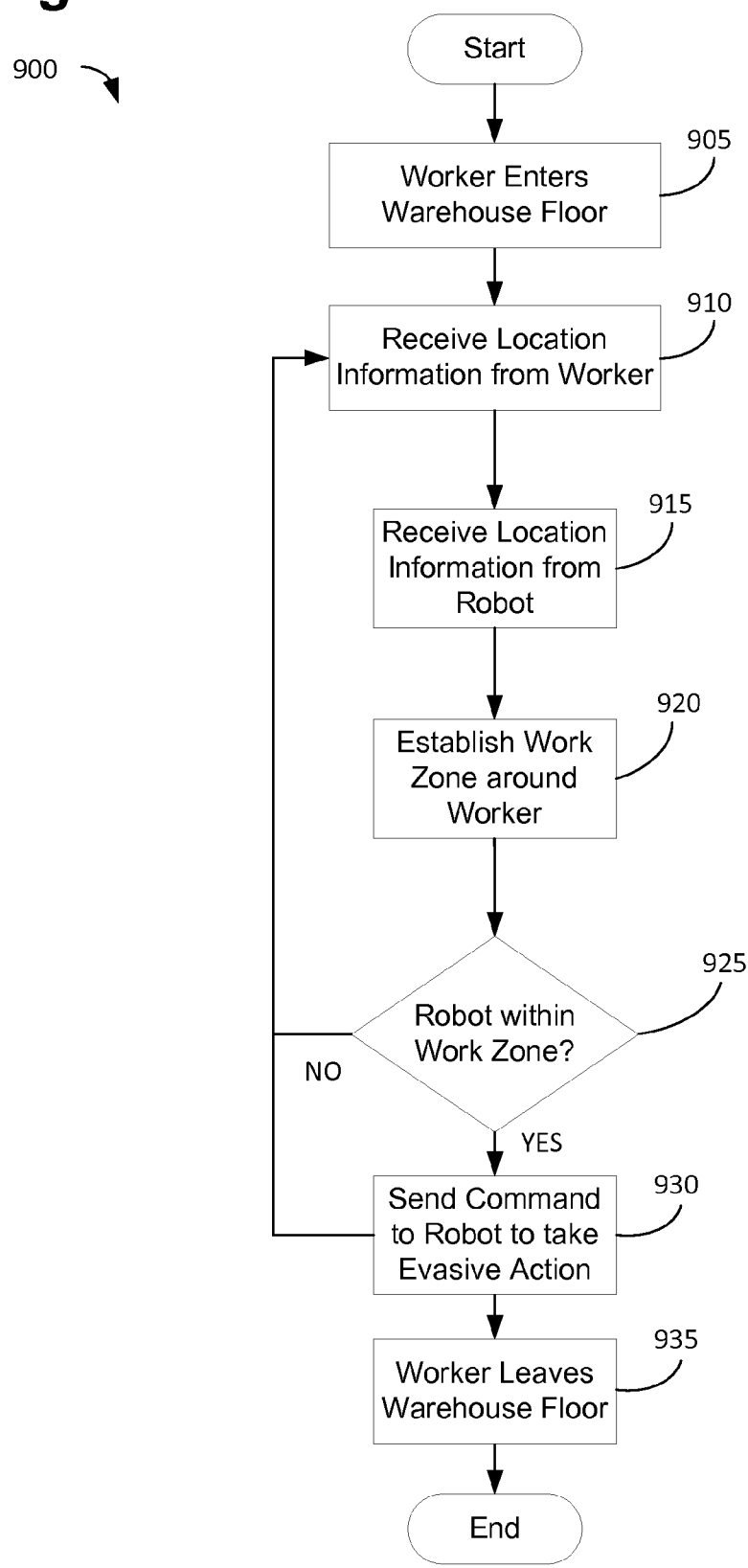

SYSTEMS AND METHODS TO FACILITATE HUMAN/ROBOT INTERACTION

BACKGROUND

Modern inventory systems, such as those in mail order warehouses, supply chain distribution centers, airport luggage systems, and custom-order manufacturing facilities, include a number of complex systems, including robots, automated shelving systems, radio frequency identification (RFID), and automated scheduling and routing equipment. Many systems, for example, comprise robots that travel to shelving systems to retrieve items, or the shelves themselves, and return them to a central location for additional processing.

Automated warehouses exist that use robots, for example, to move items or shelves from a storage location in the warehouse to a shipping location (e.g., for inventory items to be boxed and shipped). It is inevitable, however, that the paths of the robots and humans working in the warehouse will cross. Direct contact between the human workers and the robots, however, can be problematic, and a maintenance issue for the robots.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 is a pictorial flow diagram of an illustrative process for maintaining a predetermined, working distance between workers and robots on an automated warehouse floor, in accordance with some examples of the present disclosure.

FIG. 4 is an isometric view of a worker wearing a garment with multiple RFID tags configured to be read by an RFID reader on a robot, in accordance with some examples of the present disclosure.

FIG. 6 is an isometric view of a cart and a robot, each with one or more cameras to provide location information to a central control, in accordance with some examples of the present disclosure.

FIG. 9 is a flowchart depicting a method of maintaining a predetermined distance between workers and robots in an automated warehouse using location information, in accordance with some examples of the present disclosure.

DETAILED DESCRIPTION

Figure 2A:
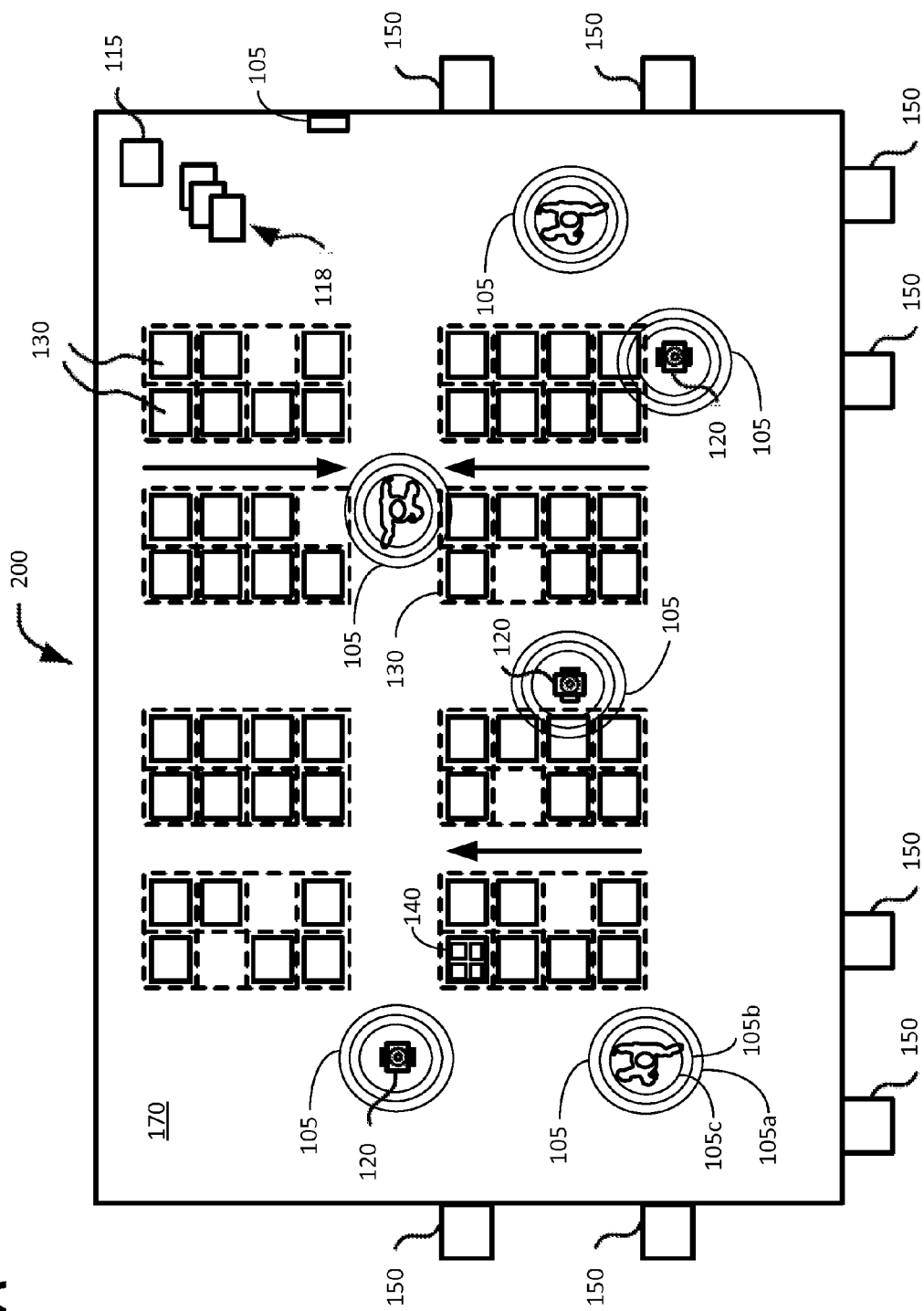
FIGS. 2A and 2B are schematic diagrams that depict components of an automated warehouse, in accordance with some examples of the present disclosure.

Examples of the present disclosure relate generally to automated warehouses, and specifically to one or more types of devices for use in the warehouse to provide a virtual work zone around warehouse workers and/or warehouse robots. In some examples, the system can comprise one or more radio frequency identification (RFID) tags and one or more RFID readers. In some examples, the warehouse workers can wear one or more RFID tags to enable to robots to sense their presence. In other examples, the warehouse robots can comprise one or more RFID tags and the warehouse worker can have an RFID reader. In this manner, when the robot senses an RFID reader associated with a warehouse worker is writing to its RFID tags, the robot can sense the presence of the worker. The warehouse worker, warehouse robot, or both can also include one or more RFID readers to identify nearby tags, verify tags, and establish virtual work zones as necessary.

While other short range transmissions technologies besides RFID, such as Bluetooth® and near field communications (NFC), could be used, one advantage of RFID tags is that they are inexpensive. In this manner, redundancy can be provided simply by using multiple RFID tags. When incorporated into a disposable garment, such as a vest or a baseball cap, for example, the whole garment can be replaced if the RFID tags have failed, or are failing. In addition, each garment and/or each robot can include multiple RFID tags to ensure readability from multiple angles and orientations. In this manner, regardless of the relative motion and orientation between the robot and the worker, at least one tag can be read and identified.

To this end, as shown in FIG. 1, examples of the present disclosure can comprise systems and methods 100 for improving efficiency and reducing maintenance in automated warehouses by, among other things, preventing collisions and other mishaps between workers 102 and robots 120. In some examples, this can be achieved using virtual work zones 105 around the robots 120, the workers 102, or both. As mentioned above, in some examples, the work zones 105 can be implemented using relatively short range communications, such as RFID, and readers capable of reading these short range communications. In this manner, when a reader on a robot 120 detects the presence of an RFID tag assigned to a worker 102 (or vice versa), for example, the robot 120 can take evasive action (e.g., slow down, stop, or reroute).

At 110, in the warehouse during normal operations, the robots 120 can be routed by a central control to various locations to, for example, retrieve merchandise, receive maintenance and/or recharging, or perform maintenance themselves (e.g., the robots 120 can take inventory images or provide lighting to maintenance operations). In some examples, the central control can determine the route for the robot from the robot's current location to the next assignment (e.g., to retrieve a shelving unit). In other examples, the central control can simply provide a location (e.g., a grid number, row number, or GPS location within the warehouse) to the robot 120, enabling the robot 120 to generate its own path.

At 125, the central control can receive a signal that a worker 102 has entered a portion of the warehouse floor 170. In some cases, this may be to enable the worker 102 to leave for the day, for example, go to the bathroom, perform maintenance operations in the warehouse, or go on a lunch break. In other cases, the worker 102 may need to enter the warehouse to remove errant items on the warehouse floor 170 such as, for example, inventory items that have fallen out of shelving units or trash. In still other examples, the worker 102 may need to retrieve an inventory item manually because the shelving unit has inadvertently become too heavy or imbalanced, for example, to be transported by a robot 120.

In some examples, the central control can receive a signal from a supervisor with access to the inventory control system that one or more workers 102 are on the warehouse floor 170. In other examples, the workers 102 may pass by an RFID scanner, light beam sensor, motion sensor, or other sensor to signal to the central control that workers 102 are present on the warehouse floor 170. In still other examples, the workers 102 can simply enter the warehouse floor 170 and the robots 120 can simply scan continuously for RFID tags associated with workers 102 (as opposed to other robots 120).

The worker 102, the robot 120, or both can be equipped with RFID tags and/or RFID readers. In some examples, the worker 102 can wear garments or other wearable devices that include RFID tags such as, for example, a shirt, vest, jacket, baseball cap, bracelet, necklace, ring, band, watch, etc. Similarly, the robot 120 may have one or more RFID tags located in various orientations (e.g., the right, left, top, bottom, forward and reverse sides). In either case, the RFID tags can be situated such that they can be read from many angles and orientations.

At 135, the robot 120 can detect the presence of a worker 102 due to RFID interaction between the robot 120 and the worker 102. In other words, depending on the configuration, of which several are discussed below, if the robot 120 (1) senses, by an RFID reader, one or more RFID tags associated with a worker 102, or (2) senses that the RFID tags on the robot 120 are being written to by an RFID reader associated with the worker 102, this indicates that the robot 120 is within the worker's work zone 105 and/or that the worker 102 is in the robot's work zone 105. In some examples, the tags and/or readers can simply sense that they are within range based on emitted signals, rather than actually performing a write to the tags.

In some examples, the robot 120 can send a detection signal to the central control that an RFID interaction exists. The central control can then send instructions to the robot establishing one or more work zones around the worker 102 and/or the robot 120. In other examples, a processor on the robot 120 can detect and process the RFID interaction. Regardless, in response, the robot 120 can take an appropriate "evasive" action.

In some examples, the robot 120 can simply stop until all RFID tags (or RFID readers) associated with a worker 102 are no longer in range of the RFID reader (or RFID tags) on the robot 120. In other examples, the robot 120 can detect its distance from the worker—using RFID tags, fiducials, or other means—as discussed below—to establish multiple, concentric work zones 105. In this manner, the robot 120 can try to reroute around the worker 102 upon initial contact with an outer work zone 105*a* (e.g., 10 feet), for example, slow down upon contact with an intermediate work zone 105*b*, and then stop upon detection of an inner work zone 105*c* (e.g., 5 feet). At 145, when the robot 120 (1) ceases to detect, with the RFID reader, RFID tags associated with the worker 102 (or any worker 102), or (2) ceases to detect a reader associated with the worker writing to its RFID tags, it can return to normal operation (e.g., continue on its route at a normal speed).

As shown in FIG. 2A, an inventory control system 200 can include a plurality of robots 120 to transport inventory items 140, shelving units, or inventory holders 130, or other objects for additional processing. In some examples, the robots 120 can retrieve inventory holders 130, for example, and deliver them to work stations 150. At the work stations 150, workers 102 can, for example, retrieve inventory items 140 from the inventory holders 130, restock the inventory holders 130, or conduct inventory for the inventory holders 130, among other things.

As mentioned above, despite the robots 120, in some cases it may nonetheless be necessary, or desirable, for workers 102 to enter the warehouse floor 170. This may simply enable the worker 102 to leave for the day, go to the bathroom, perform maintenance operations in the warehouse, or go on a lunch break. In other cases, the worker 102 may need to enter the warehouse floor 170 to remove errant items on the warehouse floor 170 such as, for example, inventory items 140 that have fallen out of shelving units or trash. In still other examples, the worker 102 may need to retrieve an inventory item 140 because the shelving unit has inadvertently become too heavy or imbalanced, for example, to be transported by a robot 120. Workers 102 may also simply need to leave or go to the break room via the warehouse floor 170.

Regardless of the reason, it is desirable to prevent incidents between workers 102 and robots 120. To this end, examples of the present disclosure can comprise an inventory control system 200 for establishing work zones 105 around the robots 120 and the workers 102. As mentioned above, the work zones 105 can be established with a variety of short range transmission technologies such as, for example, Bluetooth®, near field communication (NFC), or RFID technology. Thus, while discussed herein with respect to RFID, it should be understood that other communications protocols could be used and are contemplated herein. It should also be noted that, while they are generally referred to as "RFID readers," it is understood that RFID readers generally also have the ability to write to RFID tags.

RFID technology tends to have a relatively short range—e.g., on the order of approximately 10 feet. Within this range, RFID tags can be detected, read, and written to by an RFID reader. As a result, this limited range can also be used to establish approximate distances between the RFID tags and the RFID reader. In addition, RFID tags can be both passive and active. A passive RFID tag is powered by electromagnetic induction created when the reader reads the RFID tag. An active RFID tag is powered by a local power source (e.g., the battery for the robot 120) and thus, requires less power to read and can often be read over greater distances, among other things.

Based on the relatively short range of RFID tags, therefore, in some examples, the worker 102 can wear a garment, hat, accessory, or other wearable device that includes multiple RFID tags (e.g., in the pockets or sewn into the garment) to enable an RFID reader on the robots 120 to identify the worker 102. In this configuration, the robot 120 can slow down or stop anytime it reads an RFID tag associated with a worker 102. When the robot 120 no longer detects the presence of RFID tags associated with the worker 102, it can continue on its normal course of business.

In other examples, the robot 120 can comprise multiple RFID tags and the worker 102 can be equipped with the RFID reader. In this configuration, detection is provided when a processor in the robot 120, and in communication with the RFID tags on the robot 120, detects that one or more RFID tags on the robot 120 are being written to with a reader associated with the worker 102 (or simply that the reader is within range). As before, the robot 120 can slow down or stop anytime it detects that its RFID tags are being written to by a worker's RFID reader. In other words, in either case, the range of the RFID tags can establish the work zone 105. In this manner, when the RFID tags are within the range of the reader (i.e., are detected or written to, respectively), then the robot 120 can take action (slow down, divert, or stop).

As discussed above, in some cases, the RFID tags can also provide location or range information. In this configuration, the inventory control system 200 can establish outer 105a, intermediate 105b, and inner 105c work zones. In this manner, the robot 120 can escalate its evasive action as it gets closer and closer to the worker 102. So, for example, the robot 120 can attempt to divert around the worker 102 upon detection of the outer work zone 105a, slow down upon detection of the intermediate work zone 105b, and stop completely upon detection of the inner work zone 105c.

Figure 2B:
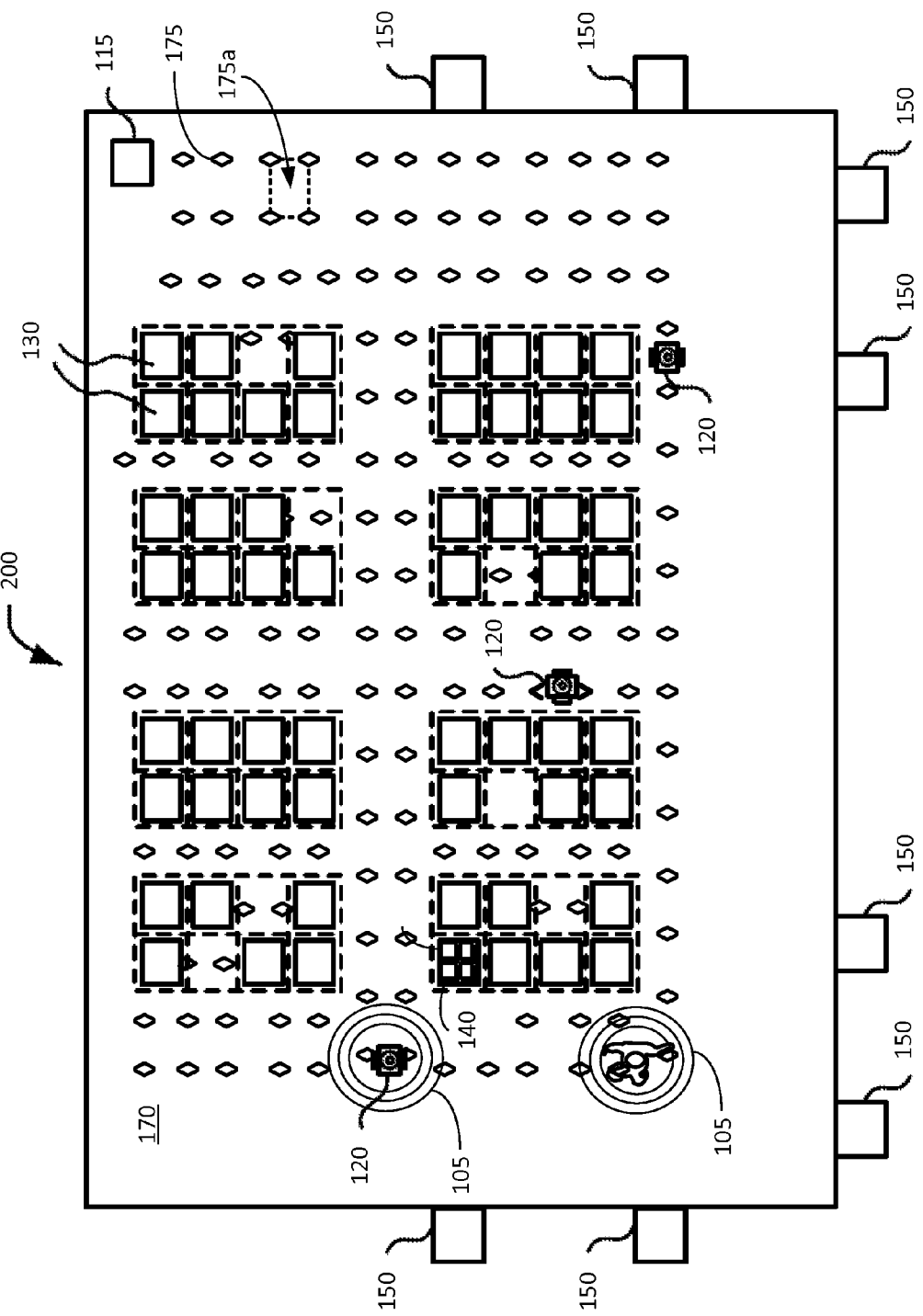

As shown in FIG. 2B, the inventory control system 200 can further comprise a central control 115, a plurality of robots 120, one or more inventory containers, pods, or holders 130, and one or more inventory work stations 150. The robots 120 can transport the inventory holders 130 between points within the warehouse floor 170 on their own, or in response to commands communicated by the central control 115. Each inventory holder 130 can store one or more types of inventory items 140. As a result, the inventory control system 200 is capable of moving inventory items 140 between locations within a workspace, such as a storage facility or warehouse floor 170 to facilitate the entry, processing, and/or removal of inventory items 140 from inventory control system 200 and the completion of other tasks involving the inventory items 140.

The central control 115 can assign tasks to the appropriate components of the inventory control system 200 and coordinate operation of the various components in completing the tasks. These tasks may relate both to the movement and processing of inventory items and the management and maintenance of the components of inventory control system 200. The central control 115 may assign portions of the warehouse floor 170, for example, as parking spaces for the robots 120, for the scheduled recharge or replacement of robot 120 batteries, for the storage of inventory holders 130, or any other operations associated with the inventory control system 200 and its various components.

The central control 115 may also select components of the inventory control system 200 to perform these tasks and communicate appropriate commands and/or data to selected components to facilitate completion of these operations. Although shown in FIG. 2B as a single, discrete component, the central control 115 may represent multiple components and may represent, or include, portions of the robots 120, inventory holders 130, or other elements of the inventory control system 200. As a result, any or all of the interaction between a particular robot 120 and the central control 115 that is described below may, for example, represent peer-to-peer communication between that robot 120 and one or more other robots 120, or may comprise internal commands based on memory in the robot 120, for example.

As mentioned above, the robots 120 can be used to move inventory holders 130 between locations within the warehouse floor 170. The robots 120 may represent many types of devices or components appropriate for use in inventory control system 200 based on the characteristics and configuration of inventory holders 130 and/or other elements of inventory control system 200. In a particular embodiment of inventory control system 200, the robots 120 can represent independent, self-powered devices, such as wheeled or tracked robots or robotic carts, for example, configured to freely move about warehouse floor 170. Examples of such inventory control systems are disclosed in U.S. Patent Publication No. 2012/0143427, published on Jun. 7, 2012, titled "SYSTEM AND METHOD FOR POSITIONING A MOBILE DRIVE UNIT," and U.S. Pat. No. 8,280,547, issued on Oct. 2, 2012, titled "METHOD AND SYSTEM FOR TRANSPORTING INVENTORY ITEMS," the entire disclosures of which are herein incorporated by reference.

In other examples, the robots 120 can comprise track guided robots configured to move inventory holders 130 along tracks, rails, cables, a crane system, or other guidance or support elements traversing the warehouse floor 170. In this configuration, the robot 120 may receive power, communications, and/or support through a connection to guidance elements such as, for example, a powered rail, slot, or track. Additionally, in some examples of the inventory control system 200, the robot 120 may be configured to utilize alternative conveyance equipment to move within warehouse floor 170 and/or between separate portions of warehouse floor 170.

Additionally, the robots 120 may be capable of communicating with the central control 115 to receive tasks, inventory holder 130 assignments, transmit their locations or the locations of other robots 120, or exchange other suitable information to be used by central control 115 or robots 120 during operation. The robots 120 may communicate with central control 115 using, for example, wireless, wired, or other connections. In some examples, the robots 120 may communicate with central control 115 and/or each other using, for example, 802.11 specification wireless transmissions (e.g., a/b/g/n), Bluetooth, radio frequency (RF), Infrared Data Association (IrDA) standards, or other appropriate wireless communication protocols.

In other examples, such as in an inventory control system 200 using tracks, the tracks or other guidance elements (e.g., slots or rails) along which robot 120 moves may be wired to facilitate communication between robot 120 and other components of inventory control system 200. Furthermore, as noted above, the robot 120 may include components of the central control 115 such as, for example, processors, modules, memory, and transceivers. Thus, for the purposes of this description and the claims that follow, communication between central control 115 and a particular robot 120 may also represent communication between components within a particular robot 120. In general, the robots 120 can be powered, propelled, and controlled in many ways based on the configuration and characteristics of a particular inventory control system 200.

The inventory holders 130 are used to store inventory items and can include additional features as part of the inventory control system 200. In some examples, each of the inventory holders 130 can include multiple dividers to create multiple bins or bays within the inventory holders 130. In this configuration, each inventory holder 130 can store one or more types of inventory items 140 in each bin or bay (e.g., each inventory holder 130 may store the same inventory item 140 in all bins or bays, or different inventory items 140 in each bin or bay, or have no bins or bays and store just one type of item 140). Additionally, in particular examples, inventory items 140 may also hang from hooks or bars within, or on, the inventory holders 130. In general, the inventory holders 130 may store inventory items 140 in any appropriate manner within the inventory holders 130 and/or on the external surface of the inventory holders 130.

The inventory holders 130 can be configured to be carried, rolled, and/or otherwise moved by the robots 120. In some examples, the inventory holders 130 may also provide propulsion to supplement that provided by robot 120 when moving multiple inventory holders 130, for example. Additionally, each inventory holder 130 may include a plurality of sides, and each bin or bay may be accessible through one or more sides of the inventory holder 130. For example, in a particular embodiment, the inventory holders 130 include four sides. In such an embodiment, bins or bays located at a corner of two sides may be accessible through either of those two sides, while each of the other bins or bays is accessible through an opening in one of the four sides and a free-standing inventory holder 130 with no bins or bays may be accessible via all four sides. The robot 120 may be configured to rotate inventory holders 130 at appropriate times to present a particular face and the bins, bays, shelves or dividers associated with that face to an operator or other components of inventory control system 200 to facilitate removal, storage, counting, or other operations with respect to inventory items 140.

In particular examples, the inventory control system 200 may also include one or more inventory work stations 150. Inventory work stations 150 represent locations designated for the completion of particular tasks involving inventory items. Such tasks may include the removal of inventory items 140, the addition, or restocking, of inventory items, the counting of inventory items 140, the unpacking of inventory items 140 (e.g. from pallet- or case-sized groups to individual inventory items), the consolidation of inventory items 140 between inventory holders 130, and/or the processing or handling of inventory items 140 in any other suitable manner. The work stations 150 may represent both the physical location and also any appropriate equipment for processing or handling inventory items, such as work benches, packing tools and supplies, scanners for monitoring the flow of inventory items in and out of inventory control system 200, communication interfaces for communicating with central control 115, and/or any other suitable components. Inventory work stations 150 may be controlled, entirely or in part, by human operators or may be partially or fully automated.

In operation, the central control 115 selects appropriate components to complete particular tasks and transmits task assignments 118 to the selected components. These tasks may relate to the retrieval, storage, replenishment, and counting of inventory items and/or the management of robots 120, inventory holders 130, inventory work stations 150, and other components of inventory control system 200. Depending on the component and the task to be completed, a particular task assignment 118 may identify locations, components, and/or actions associated with the corresponding task and/or any other appropriate information to be used by the relevant component in completing the assigned task.

In particular examples, the central control 115 generates task assignments 118 based, in part, on inventory requests that central control 115 receives from other components of inventory control system 200 and/or from external components in communication with central control 115. For example, in particular examples, an inventory request may represent a shipping order specifying particular inventory items that have been purchased by a customer and that are to be retrieved from inventory control system 200 for shipment to the customer. The central control 115 may also generate task assignments 118 in response to the occurrence of a particular event (e.g., in response to a robot 120 requesting a space to park), according to a predetermined schedule (e.g., as part of a daily start-up or cleaning routine), or at any appropriate time based on the configuration and characteristics of inventory control system 200.

The central control 115 may, in some cases, communicate task assignments 118 to a robot 120 that include one or more destinations for the robot 120. In this vein, the central control 115 may select a robot 120 based on the location or state of the robot 120, an indication that the robot 120 has completed a previously-assigned task, a predetermined schedule, and/or any other suitable consideration. For example, the task assignment may define the location of an inventory holder 130 to be retrieved, an inventory work station 150 to be visited, a storage location where the robot 120 should park until receiving another task, or a location associated with any other task appropriate based on the configuration, characteristics, and/or state of inventory control system 200, as a whole, or individual components of inventory control system 200.

As part of completing these tasks, the robots 120 may dock with various inventory holders 130 within the warehouse floor 170. The robots 120 may dock with inventory holders 130 by connecting to, lifting, and/or otherwise interacting with inventory holders 130 such that, when docked, the robots 120 are coupled to the inventory holders 130 and can move inventory holders 130 within the warehouse floor 170. While the description below focuses on particular examples of robots 120 and inventory holders 130 that are configured to dock in a particular manner, alternative examples of robots 120 and inventory holders 130 may be configured to dock in any manner suitable to allow robots 120 to move inventory holders 130 within warehouse floor 170.

Components of inventory control system 200 may provide information to the central control 115 regarding their current state, the state of other components of inventory control system 200 with which they are interacting, and/or other conditions relevant to the operation of inventory control system 200. This may allow central control 115 to utilize feedback from the relevant components to update algorithm parameters, adjust policies, or otherwise modify its decision-making to respond to changes in operating conditions or the occurrence of particular events. In addition, while central control 115 may be configured to manage various aspects of the operation of the components of inventory control system 200, in particular examples, the components themselves may also be responsible for some decision-making relating to certain aspects of their operation, thereby reducing the processing load on central control 115.

In some examples, the warehouse floor 170 floor can also comprise a plurality of markers, or fiducials 175, to enable the robots 120 to establish their location in the warehouse. Because the robots 120 are generally low enough to travel under inventory holders 130 (i.e., to be able to lift them), in some examples, the fiducials 175 can also continue under the inventory holders 130, substantially spanning the entire floor. In some examples, the area between the fiducials 175 can define grid areas 175a with a fiducial 175 at each corner. When attempting to locate a particular inventory holder 130, therefore, the robot 120 can locate the fiducial 175, or grid 175a, associated with the inventory holder's location by scanning the floor with a downward facing scanner or camera and then confirm that it is in the right location by scanning an identifier, e.g., a 2D or 3D bar code, an RFID tag, or other identifier, on the bottom of the inventory holder 130 with an upward facing scanner or camera, for example. In some examples, the inventory holder 130 and/or the fiducials 175 can include 2D or 3D bar codes, an RFID tag, or other identifiers.

Figure 3:
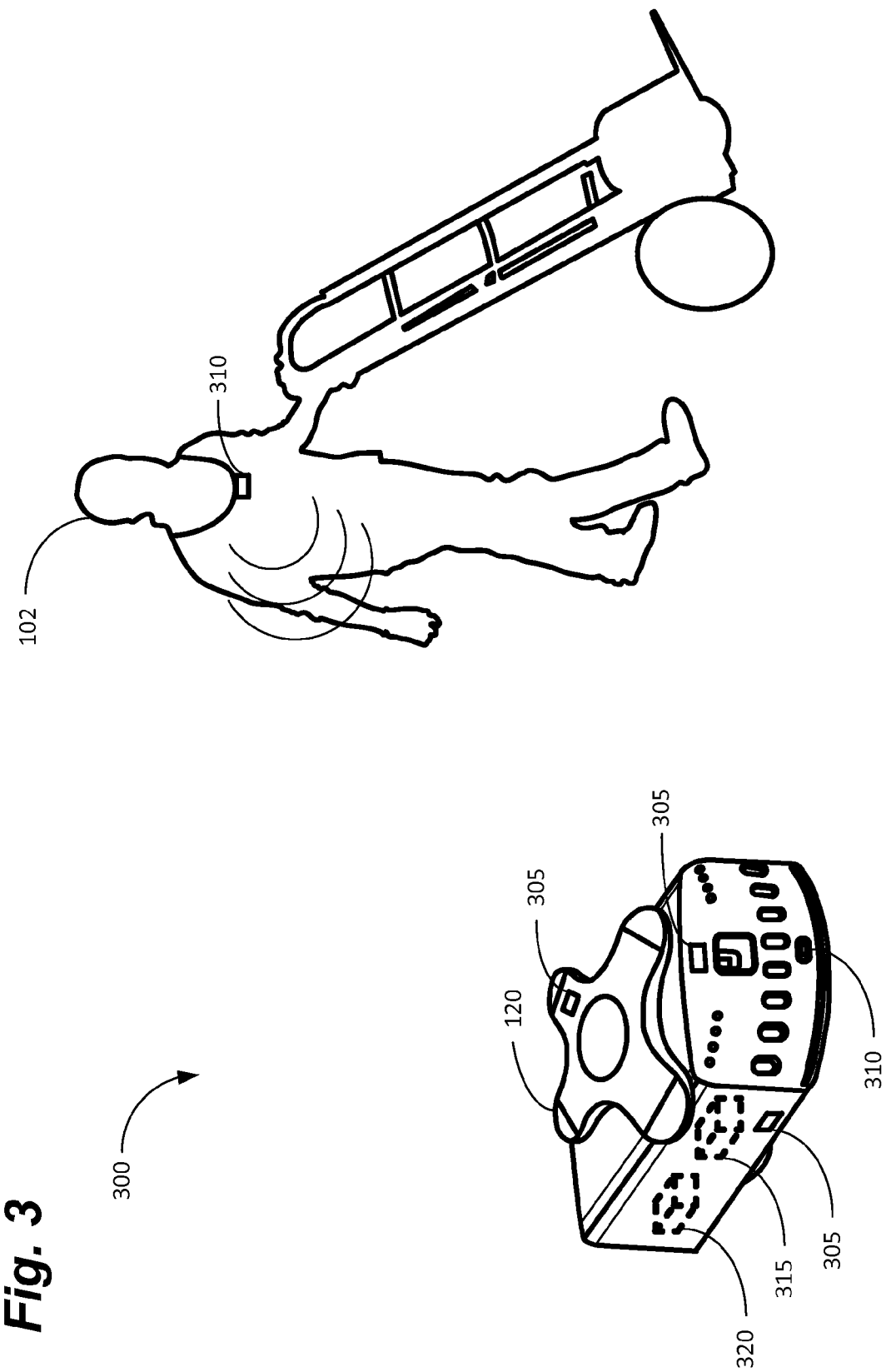
FIG. 3 is an isometric view of a robot with multiple radio frequency identification (RFID) tags configured to be read by an RFID reader on a worker, in accordance with some examples of the present disclosure.

As shown in FIG. 3, examples of present disclosure can comprise a system 300 for maintaining a predetermined, or threshold, working distance between workers 102 and robots using RFID, or other short-range transmission technologies. In some examples, the robot 120 can be equipped with one or more passive or active RFID tags 305 and the worker 102 can be equipped with an RFID reader 310. In some examples, the RFID tags 305 on the robot 120 can comprise active RFID tags 305 (i.e., tags with a power source) and can be powered by a battery 320 on the robot 120 (e.g., the battery that powers the robot 120 or a separate battery). The robot 120 can also comprise a processor 315 in communication with the one or more RFID tags 305 to monitor the status of the RFID tags 305.

In this manner, as the robot 120 travels through the warehouse, if the RFID tags 305 are sensed, scanned, or written to, by the worker's RFID reader 310, the RFID tag 305 can send a signal to the processor 315 reporting same. The robot 120 can then take evasive action because it senses it is within range of the worker 102. In other words, because the robot 120 must be within range of the RFID reader 310 for the RFID tag 305 to sense or be written to by the RFID reader 310, the robot 120 knows it is within the work zone 105. As mentioned above, the robot 120 can then attempt to reroute, slow down, or stop, as appropriate.

Of course, the predetermined, or threshold, distance to be maintained between the worker 102 and the robot 120 can vary widely depending on the size of the warehouse floor 170, the number of workers 102 and robots 120, and the level of activity at a particular time on the warehouse floor 170. If, for example, the warehouse floor 170 is particularly large, maintaining a relatively large work zone 105 (e.g., 25 feet) may be easier to manage and require less system 300 resources, while having little impact on the efficiency of the inventory control system 200. On smaller warehouse floors 170 or inventory control systems 200 with a large number of robots 120 or very busy warehouse floors 170, it may be desirable to reduce the size of the work zone (e.g., to 10 feet) to reduce the effect on robots 120 retrieving inventory holders 130 and performing other duties. Of course, many predetermined distances can be chosen to suit many warehouse and traffic configurations.

In some examples, the robot 120 can also be equipped with an RFID reader 310. The RFID reader 310 can be in communication with the processor 315 and can periodically scan for RFID tags 305 that are within range. In this manner, the robot 120 can run self-checks on the RFID tags 305 located on the robot 120 (i.e., its own RFID tags 305). In other examples, the RFID tags 305 on the robot 120 can be checked when the robot 120 docks to be recharged (approximately once per hour) or is otherwise maintained.

If one or more RFID tags 305 on the robot 120 fails, the robot 120 can report the failure to the central control 115. The central control 115 can then schedule maintenance for the robot 120 to have the failed RFID tags 305 replaced. Some, or all, of the RFID tags 305 can be replaced when any RFID tags 305 fail. In other words, because RFID tags 305 are inexpensive, it may be prudent to simply replace them all. In other examples, the central control 115 may replace the RFID tags 305 only when a certain number or percentage of RFID tags 305 fail, or when the number of operating RFID tags 305 out of the total number of RFID tags 305 reaches a predetermined level (e.g., based on the desired level of redundancy).

Because RFID tags 305 are relatively inexpensive (less than $1), the robot 120 can be equipped with multiple RFID tags 305 to provide redundancy. In this manner, a significant number of RFID tags 305 can fail without posing a concern because a significant number of RFID tags 305 remain operational. In some examples, the processor 315 and/or the central control 115 can monitor the locations of failed RFID tags 305 to ensure that at least one RFID tag 305 in each orientation (e.g., at least one RFID tag 305 on each face of the robot 120) is operational.

Similarly, as shown in FIG. 4, examples of present disclosure can comprise another system 400 for maintaining a predetermined distance between workers 102 and robots using RFID, or other short-range transmission technologies. In some examples, the worker 102 can wear a garment 405 or other wearable device, such as a vest, a hat, or coveralls that includes one or more RFID tags 305. In some examples, the RFID tags 305 can comprise surface RFID tags 305a that can be sewn or adhered, for example, to the surface of the garment 405. In other examples, the RFID tags 305 can be embedded RFID tags 305b that are sewn into, or otherwise incorporated into the garment 405. Embedded RFID tags 305b may improve the aesthetics of the garment 405, for example, or may simply provide some protection to the RFID tags 305 from abrasion or other damage. In this configuration, the RFID reader 310 on the robot 120 constantly polls for RFID tags 305 at a predetermined interval (e.g., once every second, once every 0.5 seconds) that are within range. When the robot 120 receives a return from a RFID tag 305 associated with a worker 102, the robot 120 can take evasive action.

As before, initially the robot 120 can attempt to deviate from its current route slightly to avoid the worker 102. If the worker 102 remains in range, however, or the signal gets stronger, for example, the robot 120 can slow down and eventually stop, as necessary. The robot 120 can remain in this mode of operation until the RFID reader 310 on the robot 120 no longer detects any RFID tags 305 associated with the worker 102 (or any worker 102) and then return to normal operation.

To provide additional redundancy, the robot 120 can also include one or more RFID tags 305. The RFID reader 310 on the robot 120 can then scan these RFID tags 305 to ensure that the RFID reader 310 is functioning properly. If the RFID reader 310 on the robot 120 fails to detect a predetermined number or percentage of RFID tags 305 on the robot 120, the robot 120 can alert the central control 115. The central control 115 can then take the robot 120 offline, enter a maintenance request, or stop the robot 120 immediately, among other things.

In some examples, the system 400 can also include an RFID reader 310 that can be worn by the worker 102 to ensure that a sufficient number of the RFID tags 305 in the garment 405 or other wearable device are functioning properly to meet system guidelines. In some examples, the RFID reader 310 can further comprise an indicator 325. In some examples, the indicator 325 can comprise a transceiver (e.g., a wireless transceiver) to communicate with the central control 115 to report a high number of failed RFID tags 305. The central control 115 can then provide a message to the worker 102 or a supervisor, for example, that the worker 102 needs a new garment 405 or other wearable device. In other examples, the indicator 325 can comprise a light or an audible alarm to directly alert the worker 102 of the failure. The worker 102 can then retrieve a new garment 405 or other wearable device.

Regardless of the configuration (i.e., FIG. 3 or FIG. 4), in some examples, the systems 300, 400 can also use fiducials 175 in the warehouse floor 170 to establish appropriate work zones 105 based, at least in part, on the range of the RFID readers 310 and tags 305 in the system 300, 400. In other words, in some examples, the fiducials 175 can also include RFID tags 305 to provide location information to RFID readers 310 on the robots 120 and/or workers 102 to establish the range of the RFID readers. When the RFID reader reports to the central control 115, for example, it can include all of the fiducials 175 it can "see" at any given time. Based on location information associated with the reported fiducials 175, therefore, the central control 115 can determine the range of a particular RFID reader 310 or the average range of all RFID readers 310 in the system 300, 400, for example.

The central control 115 can then use this information, in part, to establish the radius used for the outer work zone 105a. The ranges of various RFID components 305, 310 can vary widely based on, for example, atmospheric conditions, local interference, placement, battery charge levels, and angle of incidence between the reader and tag. In addition to RFID range, the size of work zones 105 can also be based on the number of robots 120 and/or workers 102 on the warehouse floor 170, the travel speed of the robots 120, and the size of the warehouse floor 170, among other things. Because some of these variables can change, in some examples, the system 300, 400 can periodically reset work zones 105 based on current conditions.

In some examples, if the range of the RFID readers 310 and/or RFID tags 305 falls below a predetermined threshold, on the other hand, the system 300, 400 can instruct one or more of the robots 120 to take evasive action. In other words, if the range for one or more RFID components 305, 310 in the system 300, 400 fall below a predetermined distance (e.g., 10 feet), then an appropriate work zone 105 may not be possible or practical. To prevent unwanted interactions between robots 120 and workers 102, therefore, the system 300, 400 can instruct some or all of the robots 120 to stop or slow down until the range issue can be rectified (e.g., with new batteries).

Figure 5A:
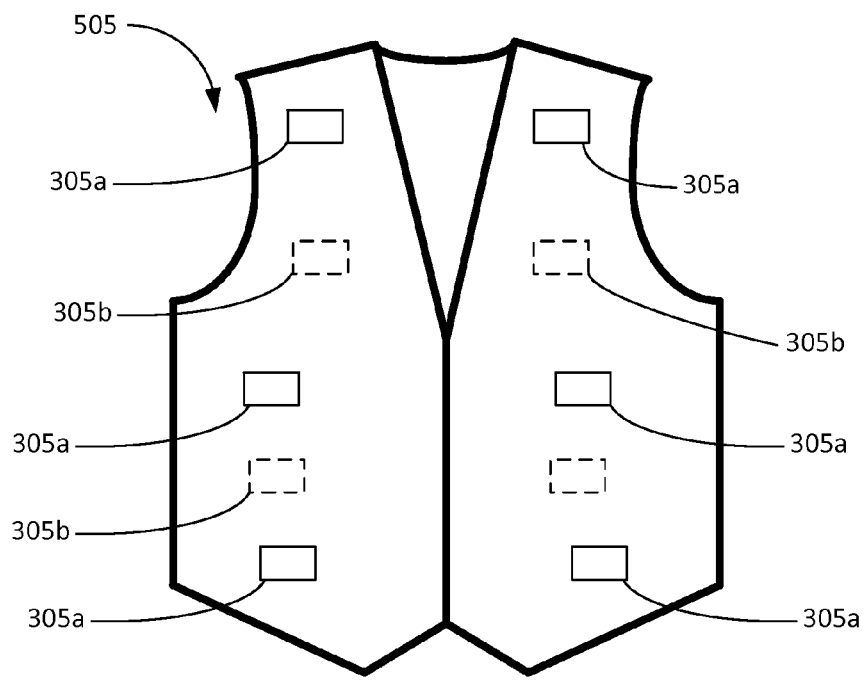
FIG. 5A is a front view of a vest with multiple RFID tags, in accordance with some examples of the present disclosure.
Figure 5B:
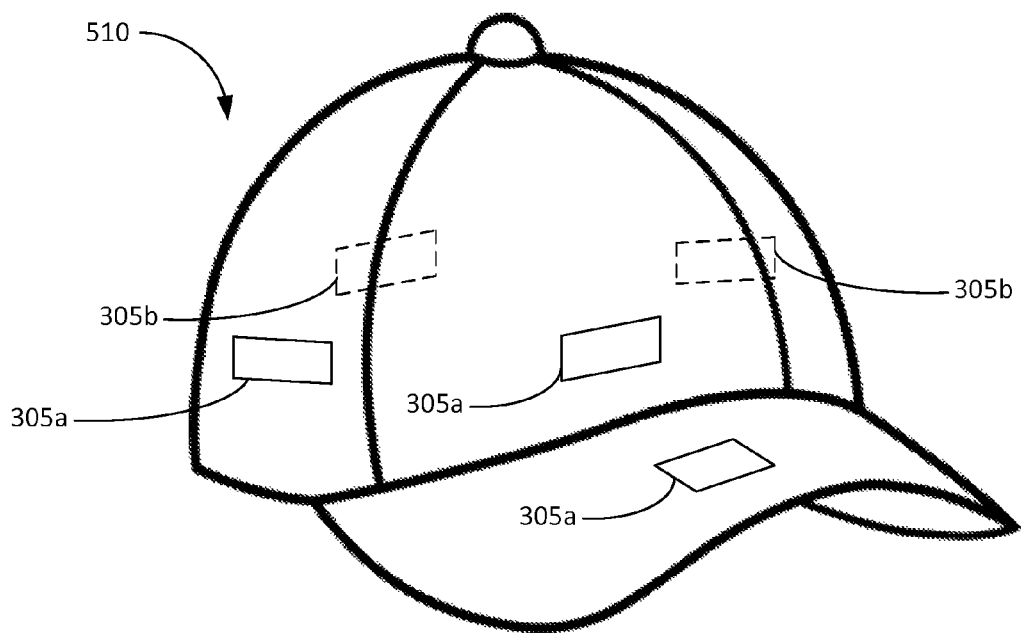
FIG. 5B is a front view of a baseball cap with multiple RFID tags, in accordance with some examples of the present disclosure.

As shown in FIGS. 5A and 5B, the system 400 can include a vest 505, hat 510, coveralls, belts, or other item of clothing (collectively, "garment") that can be easily worn and can include a plurality of RFID tags 305. In some examples, as shown, the garment can include RFID tags 305 arranged in multiple orientations and locations to enable the RFID tags 305 on the garment to be detected by RFID readers 310 regardless of their relative positions. In other words, the RFID readers 310 can detect at least one tag 305 regardless of whether the worker 102 is walking away or towards the robot 120 and regardless of the worker's relative position to the robot (e.g. in front, behind, or to either side of the robot 120).

Using multiple RFID tags 305 in each garment also increases the redundancy of the system, such that multiple RFID tag 305 failures are required before the effectiveness of the garment is significantly affected. In some examples, the garment can be disposable such that when the number of RFID tag 305 failures reaches a predetermined number or percentage, for example, the worker 102 can simply throw the vest 505 or hat 510 away and retrieve a new one. In some examples, the vest 505 and/or hat 510 can also include reflective tape or other features enabling the garment to serve multiple purposes.

In some examples, the garment can comprise RFID tags 305a mounted on the surface. In other embodiments, the garment can comprise RFID tags 305b embedded (e.g., sewn into) the garment. In still other embodiments, the garment can include multiple types of RFID tags 305a, 305b such as, for example, passive, active, and semi-active RFID tags 305.

In still other embodiments, as shown in FIG. 6, the robot 120 can comprise an onboard imaging device, or camera 605, and a transceiver 610. As the robot 120 traverses the warehouse floor 170, the camera 605 can detect and identify fiducials 175 on the warehouse floor 170. The robot 120 can communicate with the central control 115 using the transceiver 610 and can provide, for example, location, direction, and speed information.

Figure 7:
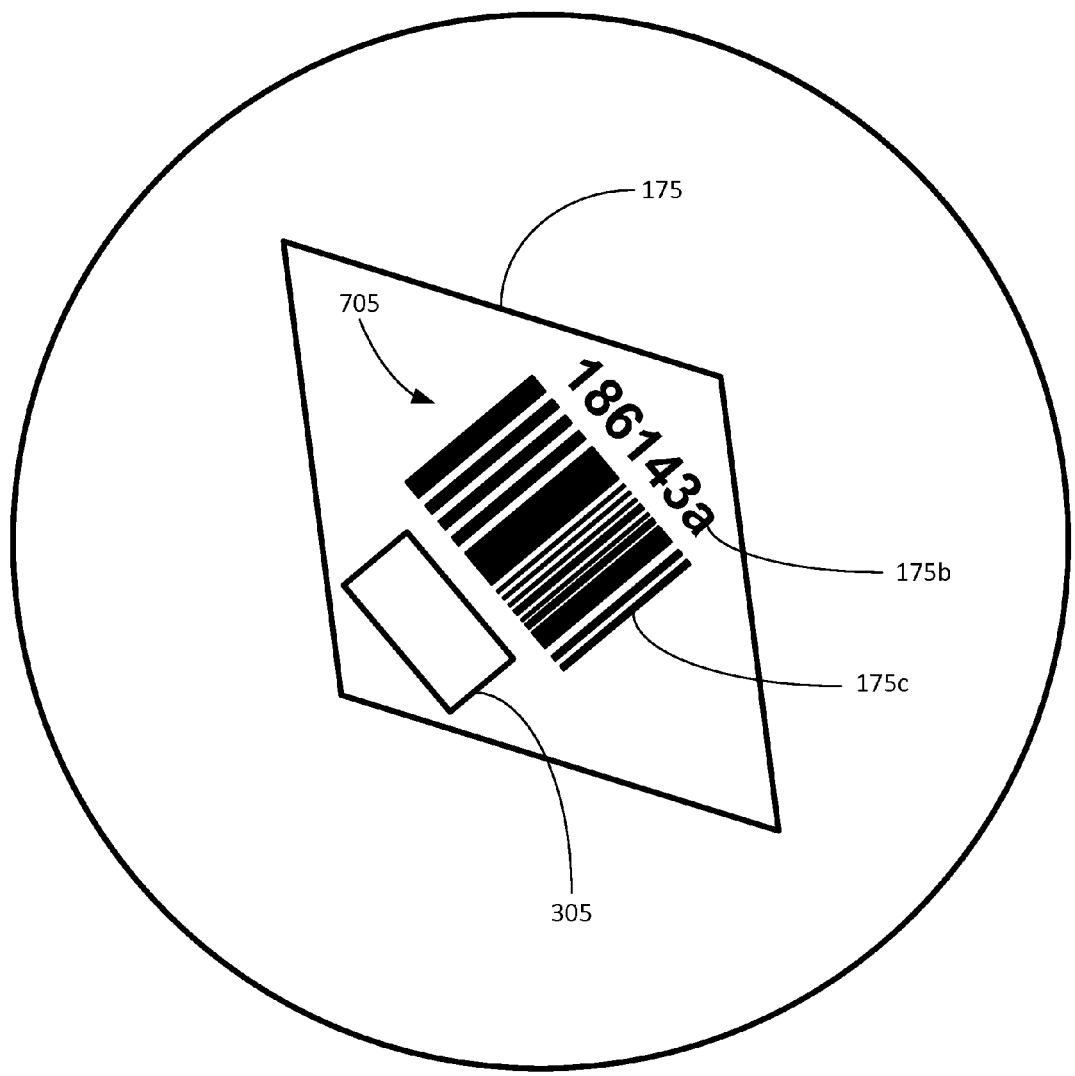
FIG. 7 is a top, detailed view of a fiducial comprising fiducial data, in accordance with some examples of the present disclosure.

As shown in FIG. 7, the fiducials 175 can comprise, for example, stickers or plaques attached to the warehouse floor 170. In some examples, the fiducials 175 can provide their location in the warehouse (e.g., they can include a coordinate, row and column number, grid number, GPS location, or other information). In some examples, the location of the fiducial 175 can be printed on the fiducial 175 and can be read by the camera 605 on the robot 120.

In other examples, as shown in detail in FIG. 7, the fiducials 175 can also comprise additional fiducial data 705. The fiducial data 705 can comprise, for example, a fiducial identification number (ID) 175b (e.g., "fiducial 186143a"). In some examples, the robot 120 can read the fiducial ID 175b with the camera 605, or other suitable device, and can cross-reference the fiducial ID 175b with an onboard database to establish its location. In other embodiments, the central control 115 can include a fiducial database and the robot 120 can transmit the fiducial ID 175b to the central control 115 and the central control 115 can provide the location of the fiducial 175 to the robot 120.

In other examples, the fiducial data 705 can also comprise, for example, a bar code 175c and/or an RFID tag 305, among other things, that can be read by the robot 120. In some examples, the bar code 175c or RFID tag 305 can have embedded location information to directly provide location information to the robot. In other embodiments, as discussed above, the robot 120 can read or scan the bar code 175c or RFID tag 305, transmit the fiducial data 705 to the central control, and receive location information for the fiducial 175 from the central control 115 to determine the location of the robot 120 on the warehouse floor 170.

Referring back to FIG. 6, in some examples, the worker 102 can also be equipped with one or more cameras 605. In some examples, the worker 102 can wear a camera 605 on a headband, armband, or a necklace. In other examples, the worker 102 can utilize a cart 615 equipped with one or more cameras 605. The cart 615 can also include one or more carrying trays 630 to enable the worker 102 to, for example, retrieve merchandise from inventory holders 130, carry tools for maintenance operations, or retrieve trash or inventory items 140 from the warehouse floor 170. Like the robot 120, therefore, as the worker 102 moves across the warehouse floor 170, the camera(s) 605 can identify and report the fiducials 175 proximate the cart 615.

The cart 615 can also comprise a processor 650 and a transceiver 655 to transmit the location of the cart 615 to the central control 115. In some examples, the processor 650 can perform some or all of the image processing (e.g., parsing) required for the images from the one or more cameras 605 to reduce bandwidth between the cart 615 and the central control 115. Thus, the central control 115 can receive periodic updates from both the robot 120 and the cart 615 regarding their location and/or including imagery or data related to imagery from the one or more cameras 605 on the robots 120 and cart 615. This can enable the central control 115 track the locations of the robots 120 and the cart 615 and instruct the robot 120 to take evasive action when necessary. In some cases, the central control 115 can track the robot 120 and the cart 615, determine when the robot 120 and the cart 615 are on a collision course, and reroute the robot 120 as necessary, for example.

It is, of course, possible that the worker 102 could walk away from the cart 615, rendering their location unknown to the central control 115. In other words, when the worker 102 walks away from the cart, the cameras 605 on the cart 615 provide the central control 115 with the location of the cart 615, but not the location of the worker 102. As a result, in some examples, the system 600 can also comprise a "tether" 625 between the cart 615 and the worker 102.

In some examples, the tether 625 can be a physical tether 625, similar to those used on boats and jet skis, for example, and can comprise a physical connection between the cart 615 and the worker 102. The tether 625 can comprise, for example, a lariat or harness around the worker's wrist, or attached to the worker's clothes, and then attached to a switch on the cart 615. In other examples, the tether 625 can comprise an electromechanical connection between the cart 615 and the worker 102. In some examples, the handle 635 of the cart 615 can comprise one or more electrical contact pads for measuring the temperature, resistance, or capacitance of the handle 635, for example. In this configuration, the central control 115 can determine that the worker 102 has one or both hands on the handle.

In still other embodiments, the tether 625 can comprise what is essentially an "electromagnetic" tether. In other words, using RFID technology, or other short range link, in a similar manner to that discussed above, the tether 625 can determine whether the worker 102 is within a certain distance of the cart 615. So, for example, as discussed above, the system 600 can include a garment for the worker 102 (e.g., a vest 505) comprising one or more RFID tags 305 and the cart 615 can comprise a RFID reader 310. When the worker 102 is within range of the RFID reader 310, therefore, the tether 625 can be considered "latched," and the system 600 can operate normally.

If the worker 102 is out of range of the RFID reader 310, on the other hand, the tether 625 can be considered "unlatched," send an unlatched signal to the central control 115, which may require the central control 115 to stop all robots 120 in the warehouse, or in a portion of the warehouse, until the worker 102 can be "found." In other words, if the tether 625 is unlatched, the location of the worker 102 on the warehouse floor 170 is essentially unknown. If this is the case, the central control 115 cannot accurately route robots 120 around the worker 102 and may have no choice but to shut down all of the robots 120. In some cases, when the worker 102 returns to the cart 615, the tether 625 can automatically "relatch," send a relatch signal to the central control 115, and normal warehouse operations can resume. In some examples, to prevent a total shutdown, the system 600 can include a secondary location system using, for example, RFID, proximity sensors, infrared cameras, or facial recognition, to locate the worker 102. In a preferred example, workers 102 can simply be trained to stay within range of their cart 615 at all times.

In some examples, a similar system 600 can be used in a work station 150. In other words, while the worker 102 in a work station 150 is theoretically stationary, in some instances, the worker 102 may need to temporarily leave the bounds of the work station 150 to retrieve a dropped item, for example. Thus, while a "permanent" work zone 105 may exist with respect to the work station 150 (to keep robots 120 from driving through the work station 150), if the worker 102 leaves the work station 150, the robots 120 may need to take additional evasive action.

To this end, if the system 600 detects that the worker 102 has left the work station 150, the system 600 can instruct one or more robots 120 to slow down or stop, for example. In this situation, the tether 625 can comprise, for example, a light curtain, light beam, or proximity sensor to determine when the worker 102 leaves the work station 150. In some examples, the work station 150 can also comprise an additional RFID reader 310 to provide additional range information to the central control 115.

Figure 8:
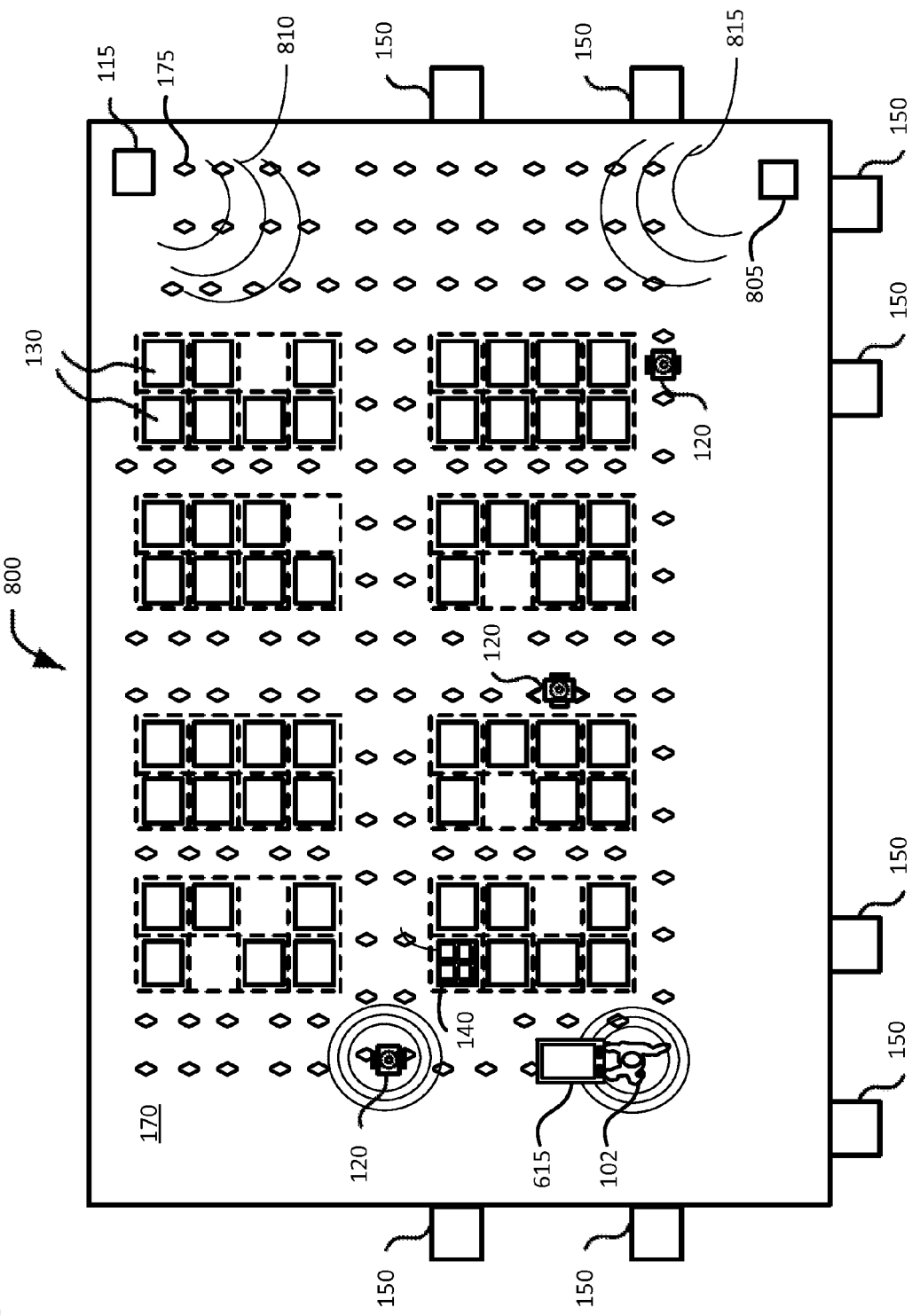
FIG. 8 is a schematic diagram that depicts components of another automated warehouse comprising a separate server, in accordance with some examples of the present disclosure.

In some examples, as shown in FIG. 8, it may be desirable to have a warehouse system 800 with separate management and interaction systems. In other words, the system 800 can comprise a central control 115 for managing overall routing and work flow and a second server 805 for managing worker 102/robot 120 interactions. In this manner, a higher level of redundancy can be provided and each system 100, 800 can be optimized for the purpose at hand.

To this end, in addition to the redundancy provided by the use of multiple RFID tags 305 and RFID readers 310, as discussed above, in some examples, the work zones 105, robots 120, and workers 102 can be monitored and managed by a dedicated interaction server 805. In this configuration, the central control 115 can handle the routing and scheduling of robots 120 during normal operation—e.g., retrieving inventory holders 130 and delivering them to work stations—while the interaction server 805 can monitor workers 102 and robots 120 solely for the purpose of preventing incidents. In this manner, the operations of the robots 120 and the workers 102 are not in conflict, reliability is increased via redundant communications and control systems, and downtime and maintenance is reduced by reducing the number of robot 120/worker 102 interactions, among other things.

In some examples, the robots 120 can be in communication with the central control 115 via a first, dedicated communications network 810 and in communication with the interaction server 805 via a second, dedicated communications network 815. Both networks can comprise, for example, wireless LANs (e.g., 802.11x networks), or other suitable networks. In some examples, the interaction server 805 and second network 815 can also be on dedicated internet, power, or network connections, as necessary.

In some examples, therefore, the second network 815 can also comprise a network with a higher level of reliability and/or security than the first network 810. The second network 815 may also be able to override the first network 810. In other words, if the interaction server 805 determines that an incident between a worker 102 and a robot 120 is imminent, the interaction server 805 can send a command to the robot 120 regardless of whether the robot 120 is currently receiving a command from the central control 115. In this case, the robot 120 can ignore the command from the central control 115, take evasive action, if necessary, and then reconnect with the central control 115 when the worker is no longer proximate the robot 120.

As shown in FIG. 9, examples of the present disclosure can also comprise a method for using the location information from the fiducials 175 to maintain a predetermined distance between workers and robots. At 905, a worker enters the floor of the warehouse. As mentioned above, there are several reasons the worker may need or want to enter the warehouse floor.

At 910, the aforementioned camera(s) can begin to provide location information for the worker to the central control or the interaction server. In some examples, the cameras can be located on the worker or on a cart used by the worker and can be activated manually by the worker, or automatically upon entering the warehouse. In some examples, the cart can comprise a motion sensor, for example, which can signal the cameras and transceiver to begin sending location information. In still other examples, the system can include light beams, sensors, infrared sensors, motions sensors, or other means to detect workers in the warehouse. The location information from the worker can be updated periodically at a constant or variable rate, which can change based on the number of workers and robots in motion in the warehouse, the level of activity in the warehouse, and other factors.

At 915, the central control or interaction server can also receive location information from a plurality of robots on the warehouse floor. In the case of the central control, the location information may already be provided automatically as part of the inventory management system. In other cases, the interaction server, for example, may begin polling robots for location information upon receiving location information from the worker or upon receiving a notification that a worker has entered the warehouse (e.g., from a motion sensor in the warehouse). Again, the location information from the robot can be updated periodically at a constant or variable rate, which can change based on the number of workers and robots in motion in the warehouse, the level of activity in the warehouse, and other factors.

At 920, based on the location information from the worker, the system can establish a virtual work zone around the worker. As discussed above, this can comprise a single work zone at a predetermined distance (e.g., 10 feet), or can comprise a multi-level work zone within which the level of evasive action is escalated as the robot gets closer to the worker. At 925, the system can determine whether the robot is within the work zone based on the location information. If the robot is not within the work zone, the system can simply wait for the next location update from the worker, at 910, and the robot, at 915.

At 930, if the robot is within the work zone, on the other hand, the system (i.e., the central control or interaction server) can send a command to take evasive action. In some examples, such as with a single layer work zone, the system can simply command the robot to stop. In other examples, the system can take escalating evasive action—e.g., reroute→slow down→stop—as the robot enters an outer, intermediate, and inner work zone, respectively. In this manner, when a robot and a worker are merely traveling close to one another or at an oblique angle, a slight deviation can enable the robot to miss the worker with little interruption to the system. If the worker and the robot are on a collision course, on the other hand, the robot may need to simply stop and yield the right-of-way to the worker. At 935, the system can continue to monitor and control the robots, as necessary, until the worker leaves the warehouse floor.

In yet other examples, the robot can switch to a different navigation/sensing system. In other words, part of the evasive action can comprise switching over to a sensor with higher resolution, such as a high resolution video camera, to enable more precise robot maneuvering. In other examples, the robot can switch over to a second, more precise navigation system or algorithm. In this manner, rather than simply moving from one fiducial to the next along a travel direction, the robot can utilize additional inputs to enable the robot to accurately reroute, slow, or stop, as necessary.

Figure 10A:
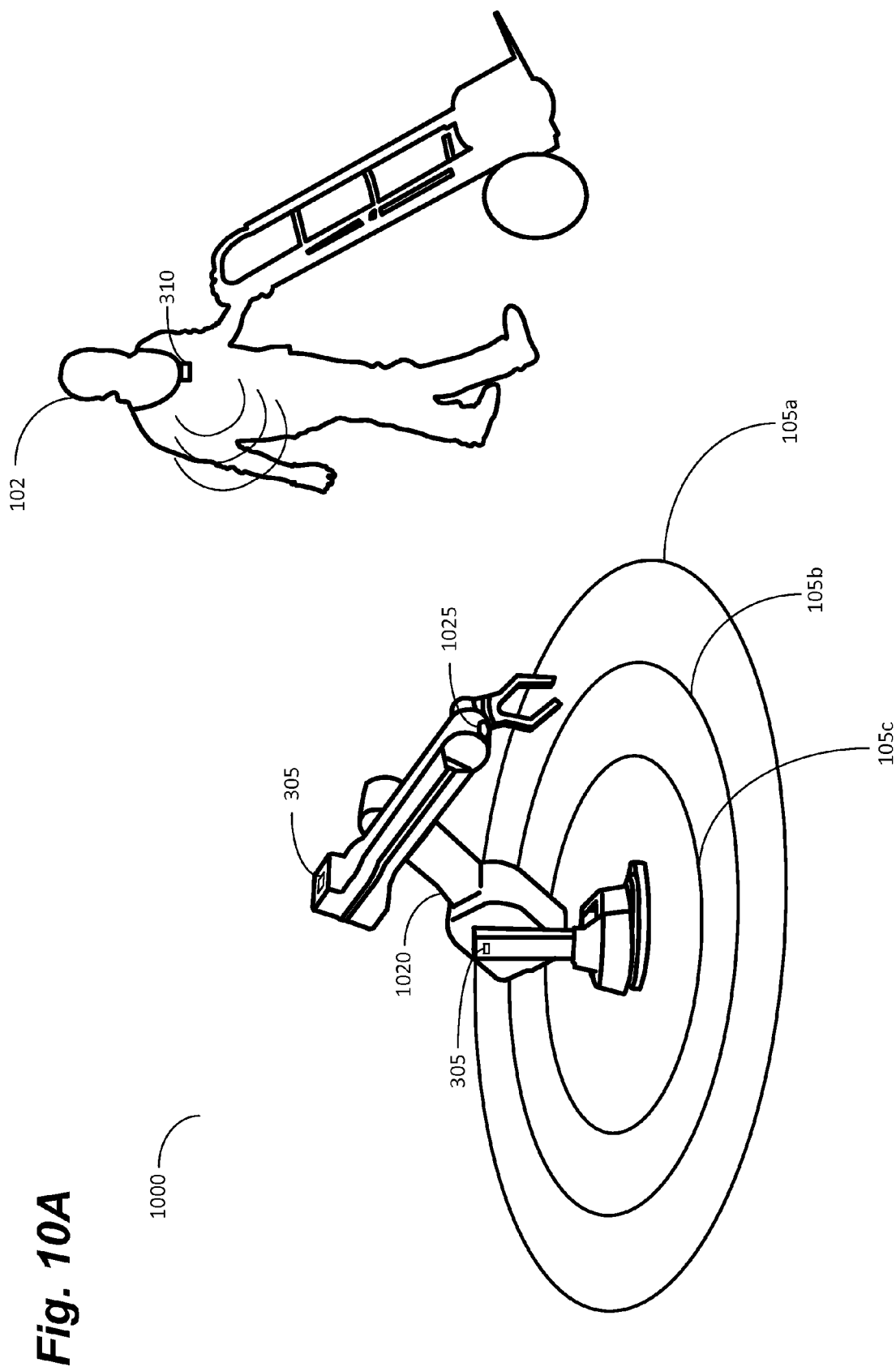
FIG. 10A is an isometric view of a stationary robotic arm comprising multiple RFID tags configured to be read by an RFID reader on a worker and a circular work zone around the stationary robotic arm, in accordance with some examples of the present disclosure.
Figure 10B:
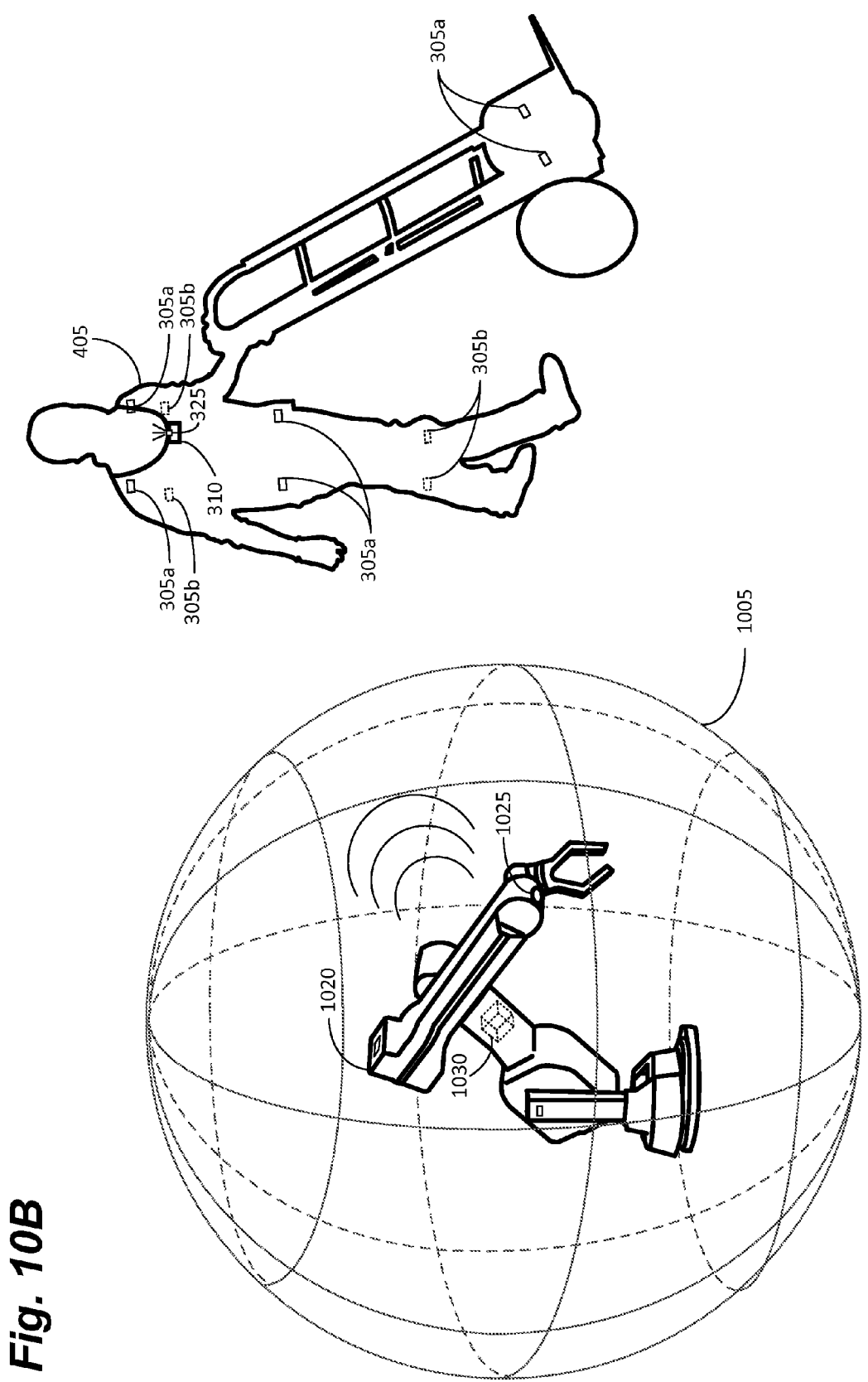
FIG. 10B is an isometric view of a worker wearing a garment with multiple RFID tags configured to be read by an RFID reader on the stationary robotic arm and a spherical work zone around the stationary robotic arm, in accordance with some examples of the present disclosure.
Figure 10C:
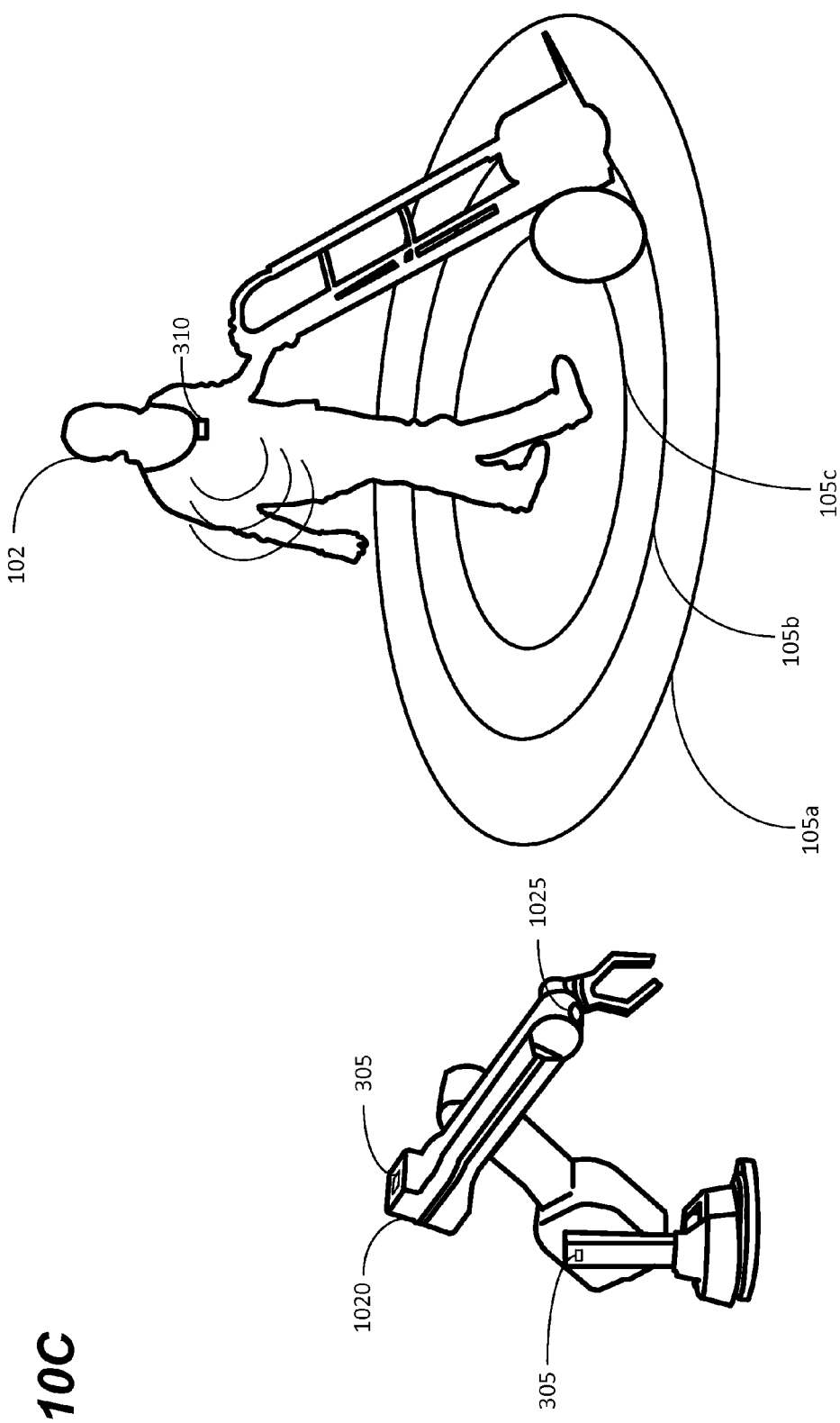
FIG. 10C is an isometric view of a stationary robotic arm comprising multiple RFID tags configured to be read by an RFID reader on a worker and a circular work zone around the worker, in accordance with some examples of the present disclosure.

In still other examples, the systems described herein can also be used to provide a work zone 105, 1005 around a stationary robotic arm 1020 (FIGS. 10A and 10B) or around a worker 102 in proximity to the robotic arm 1020 (FIG. 10C). A stationary robotic arm 1020 may be used in the warehouse, for example, to unload boxes, perform maintenance, or handle other tasks that can be completed in a relatively consistent area. In other examples, the robotic arm 1020 may be moveable, but not mobile per se, to perform jobs in a limited number of places, for example, or for longer work intervals. Regardless, while the robotic arm 1020 is not mobile, the robotic arm 1020 nonetheless has a circle or sphere of motion, depending on its capabilities, within which it operates. Direct contact between workers 102 and the robotic arm 1020 can be problematic, reduce efficiency, and increase maintenance for the robotic arm 1020.

To this end, as with the mobile robots 120 discussed above, it can be useful to establish one or more work zones 1005, which can include circles 105 (FIG. 10A) or spheres 1005 (FIG. 10B). As before, in some examples, the system 1000 can include an outer work zone 105*a*, an intermediate work zone 105*b*, and an inner work zone 105*c*. This can enable the robotic arm 1020 to take one or more evasive actions as a worker 102 (or robot 120) enters the work zone 105. In some examples, the system 1000 can use multiple spherical work zones 1005

In some examples, the system 1000 may slow down the robotic arm 1020 when a worker 102 enters the outer work zone 105*a*. The system 1000 may then apply brakes and/or assume a predetermined position when a worker 102 enters the intermediate work zone 105*b*. Finally, the system 1000 may remove power from the robotic arm 1020 when a worker 102 enters the inner work zone 105*c*. In some examples, the robotic arm 1020 may put objects down on the floor, or other work surface, and wait for the worker 102 to leave the work zone 105 or take other additional actions during this process.

As with the systems 300, 400, 600 discussed above, the system 1000 can comprise one or more RFID readers/tags and/or imaging devices to maintain a work zone 1005 around the robotic arm. In some examples, as shown in FIG. 10A, the system 1000 can comprise one or more RFID tags 305 disposed on the robotic arm 1020 and an RFID reader 310 on the worker 102 to detect an RFID interaction. In other examples, as shown in FIG. 10B, the system 1000 can utilize multiple surface mount 305*a*, or embedded 305*b*, RFID tags on the worker 102 and an RFID reader 1030 on the robotic arm 1020 to detect RFID interactions. In still other examples, the robotic arm 1020 can comprise one or more imaging devices 1025 to provide information related to the position of the robotic arm 1020 and/or work zones 105, 1005.

While several possible examples are disclosed above, examples of the present disclosure are not so limited. For instance, while a system for maintaining a predetermined distance between robots and workers in an automated warehouse is disclosed, the system could also be used anytime humans and automated machines or fixed robotic systems interact. In addition, the location and configuration used for various features of examples of the present disclosure such as, for example, the location and configuration of RFID tags and readers, the types of cameras or other sensors used, and the layout of the warehouse can be varied according to a particular warehouse, location, or robot that requires a slight variation due to, for example, size or power constraints, the type of robot required, or regulations related to transmission interference, for example. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system for maintaining a threshold distance between a robot and a worker in a workspace, the system comprising:
   a wearable device comprising one or more radio frequency identification (RFID) tags, the wearable device associated with the worker;
   a robot to perform one or more tasks in the workspace, the robot comprising:
      one or more drive mechanisms to move the robot throughout the workspace;
      an RFID reader configured to read the one or more RFID tags; and
      a processor in communication with the RFID reader;
      wherein the RFID reader sends a signal to the processor based at least in part on the RFID reader reading at least one of the one or more RFID tags; and
      wherein the processor instructs the robot to take evasive action based at least in part on receiving the signal from the RFID reader.

2. The system of claim 1, wherein the RFID reader refrains from sending the signal to the processor based at least in part on the RFID reader no longer reading at least one of the one or more RFID tags; and
   wherein the processor instructs the robot to resume normal operation based at least in part on the processor no longer receiving the signal from the RFID reader.

3. The system of claim 1, wherein taking evasive action comprises the processor instructing the robot to at least one of stop, slow down, or reroute.

4. The system of claim 1, wherein the one or more RFID tags comprise a first group of one or more RFID tags, and the signal comprises a first signal;
   the robot further comprising:
      a second group of one or more RFID tags disposed on the robot;
   wherein the RFID reader sends a second signal to the processor based at least in part on the RFID reader reading at least one of the second group of one or more RFID tags;
   wherein the RFID reader refrains from sending the second signal to the processor when the RFID reader no longer reads at least one of the second group of one or more RFID tags; and
   wherein the processor instructs the robot to stop based at least in part on the processor no longer receiving the second signal from the RFID reader.

5. The system of claim 4, wherein the RFID reader comprises a first RFID reader, and further comprising:
   a second RFID reader comprising an indicator, and associated with the worker;
   wherein the indicator is activated when the second RFID reader no longer reads a predetermined number of the first group of one or more RFID tags.

6. A system comprising:
   a short range transmission reader associated with a worker;
   a robot to perform one or more tasks in a workspace, the robot comprising:
      one or more short range transmission tags mounted in one or more locations and orientations on the robot; and
      a processor in communication with the one or more short range transmission tags;
      wherein the processor receives a signal from a first short range transmission tag of the one or more short range transmission tags based at least in part on the first short range transmission tag being written to by the short range transmission reader; and
      wherein the first short range transmission tag being written to by the short range transmission reader indicates a short range transmission interaction between the robot and the worker.

7. The system of claim 6, wherein the processor instructs the robot to take evasive action based at least in part on receiving the signal.

8. The system of claim 7, wherein taking evasive action comprises the processor instructing the robot to at least one of stop, slow down, or reroute.

9. The system of claim 6, the robot further comprising:
   a transceiver for wirelessly communicating with a central control;
      wherein the processor sends the signal to the central control via the transceiver; and
      wherein the transceiver receives one or more instructions from the central control for the robot to take evasive action.

10. The system of claim 9, wherein taking evasive action comprises the processor instructing the robot to at least one of stop, slow down, or reroute.

11. The system of claim 6, wherein the first short range transmission tag refrains from sending the signal to the processor when the first short range transmission tag is no longer being written to by the short range transmission reader; and
    wherein the processor instructs the robot to resume normal operation based at least in part on the processor no longer receiving the signal from first short range transmission tag.

12. The system of claim 6, wherein the short range transmission reader comprises a first short range transmission reader and the robot further comprises:
    a second short range transmission reader disposed on the robot;

wherein the second short range transmission reader writes to the one or more short range transmission tags to verify operation of the one or more short range transmission tags;

wherein each of the one or more short range transmission tags sends a confirmation signal to the processor when the second short range transmission reader writes to the each of the one or more short range transmission tags, respectively; and wherein the processor instructs the robot to seek maintenance when the processor no longer receives the confirmation signal from a predetermined number of the one or more short range transmission tags.

13. The system of claim 6, wherein the short range transmission tags comprise radio frequency identification (RFID) tags; and wherein the short range transmission reader comprises an RFID reader.

14. A method comprising:

receiving, at a robot, routing instructions from a central control, including at least a destination, to perform a task in a workspace;

receiving, at the robot, a signal from the central control that a worker has entered the workspace;

receiving a first instruction, at the robot from the central control, to take evasive action in response to a detection, by a radio frequency identification (RFID) reader, of an RFID interaction with one or more RFID tags between the robot and the worker; and receiving a second instruction, at the robot from the central control, to resume normal operation in response to a detection, by the RFID reader, that the RFID interaction with the one or more RFID tags between the robot and the worker has ended.

15. The method of claim 14, wherein the one or more RFID tags are mounted on the robot and the RFID reader is associated with the worker, and further comprising:

detecting, with a processor on the robot, that the one or more RFID tags mounted on the robot are within range of the RFID reader associated with the worker; and sending a detection signal from the robot to the central control indicating the RFID interaction between the robot and the worker.

16. The method of claim 14, wherein the RFID reader is mounted on the robot and the one or more RFID tags are associated with the worker, and further comprising:

detecting, with the RFID reader on the robot, the one or more RFID tags associated with the worker; and sending a detection signal from the robot to the central control indicating the RFID interaction between the robot and the worker.

17. The method of claim 14, further comprising:

detecting, with an RFID reader on the robot, one or more RFID tags attached to a floor in the workspace;

sending data associated with the one or more RFID tags from the robot to the central control; and receiving, at the robot, an instruction from the central control to take evasive action based at least in part on a range calculation for at least one of the RFID reader or the one or more RFID tags based at least in part on the data associated with the one or more RFID tags;

wherein the data associated with the one or more RFID tags comprises at least location information for the one or more RFID tags.

18. The method of claim 14, wherein the first instruction further comprises information related to a virtual work zone around the worker in response to the RFID interaction.

19. The method of claim 18, wherein the virtual work zone further comprises at least one of:

an outer work zone, an intermediate work zone, or an inner work zone.

20. The method of claim 19, wherein the evasive action further comprises at least one of:

a first evasive action when the robot crosses the outer work zone;

a second evasive action when the robot crosses the intermediate work zone; or a third evasive action when the robot crosses the inner work zone.

* * * * *